US012688542B2

(12) United States Patent
Day et al.

(10) Patent No.: US 12,688,542 B2
(45) Date of Patent: Jul. 21, 2026

(54) SECURITY SYSTEM

(71) Applicant: SAFEEVAC, INC., Evansville, IN (US)

(72) Inventors: Michael Joseph Day, Evansville, IN (US); Michael Lynn Sandefur, Evansville, IN (US); Patrick Joseph Boarman, Evansville, IN (US)

(73) Assignee: SafeEVAC, Inc., Evansville, IN (US)

( * ) Notice: Subject to any disclaimer, the term of this patent is extended or adjusted under 35 U.S.C. 154(b) by 0 days.

(21) Appl. No.: 18/760,186

(22) Filed: Jul. 1, 2024

(65) Prior Publication Data

US 2024/0354884 A1 Oct. 24, 2024

Related U.S. Application Data

(62) Division of application No. 16/359,341, filed on Mar. 20, 2019, now Pat. No. 12,026,797.

(Continued)

(51) Int. Cl.

| | |
|---|---|
| ***G06Q 90/00*** | (2006.01) |
| ***G08B 5/36*** | (2006.01) |
| ***G08B 5/38*** | (2006.01) |
| ***G08B 7/06*** | (2006.01) |
| ***G08B 19/00*** | (2006.01) |
| ***G08B 21/02*** | (2006.01) |
| ***G08B 27/00*** | (2006.01) |
| ***G09F 13/00*** | (2006.01) |

(52) U.S. Cl.

CPC ............. *G06Q 90/205* (2013.01); *G08B 5/36* (2013.01); *G08B 5/38* (2013.01); *G08B 7/066* (2013.01); *G08B 19/00* (2013.01); *G08B 21/02* (2013.01); *G08B 27/00* (2013.01); *G09F 13/005* (2013.01)

(58) Field of Classification Search

CPC .......... G06Q 90/205; G08B 5/36; G08B 5/38; G08B 7/066; G08B 21/02; G08B 27/00; G09F 13/005

See application file for complete search history.

(56) References Cited

U.S. PATENT DOCUMENTS 4,796,018 A * 1/1989 Nakanishi .............. G08B 7/062 315/76
6,539,657 B1 * 4/2003 Qualls, Jr. ............ G02B 6/0091 40/546

(Continued)

*Primary Examiner* — John A Tweel, Jr.
(74) *Attorney, Agent, or Firm* — Dentons Bingham Greenebaum LLP; Brian W. Chellgren; James C. Eaves, Jr.

(57) ABSTRACT

Systems and methods for providing security to building occupants include a plurality of smart exit signs positioned at locations in or around a secure area to be monitored. Input devices contained in the smart exit signs are configured to be receptive to sensory activity within the secure area. The system further includes a master controller configured to analyze input signals indicative of the sensory activity detected within the secure area to determine whether a potential security issue exists. Output devices contained in the smart exit signs are configured to receive indication from the master controller when a potential security issue exists. In response to receiving indication from the master controller, the output devices are configured to assist occupants within the secure area to respond to the potential security issue by providing real-time information on optimum exit routes or shelter-in-place locations.

21 Claims, 22 Drawing Sheets

Related U.S. Application Data

(60) Provisional application No. 62/767,121, filed on Nov. 14, 2018, provisional application No. 62/690,643, filed on Jun. 27, 2018, provisional application No. 62/650,008, filed on Mar. 29, 2018, provisional application No. 62/645,526, filed on Mar. 20, 2018.

(56) References Cited

U.S. PATENT DOCUMENTS

| | | | | |
|---|---|---|---|---|
| 7,619,538 | B1 * | 11/2009 | Zarian | G08B 7/062<br>340/506 |
| 10,410,310 | B2 * | 9/2019 | Bora | A62B 5/00 |
| 12,026,797 | B2 * | 7/2024 | Day | G08B 21/02 |
| 12,211,372 | B2 * | 1/2025 | Day | G08B 5/38 |
| 2014/0266669 | A1 * | 9/2014 | Fadell | G08B 19/00<br>340/501 |
| 2017/0052539 | A1 * | 2/2017 | Kerzner | G08B 25/10 |
| 2017/0107039 | A1 * | 4/2017 | Chavez | E05G 1/10 |

* cited by examiner

SECURITY SYSTEM

CROSS-REFERENCE TO RELATED APPLICATION

This patent application is a divisional of U.S. patent application Ser. No. 16/359,341, filed Mar. 20, 2019, now U.S. Pat. No. 12,026,797, issued Jul. 2, 2024, which claims the benefit of U.S. Provisional Application No. 62/645,526, filed Mar. 20, 2018, U.S. Provisional Application No. 62/650,008, filed Mar. 29, 2018, U.S. Provisional Application No. 62/690,643, filed Jun. 27, 2018, and U.S. Provisional Application No. 62/767,121, filed Nov. 14, 2018, each of which is incorporated herein by reference.

FIELD OF THE INVENTION

A security system provides occupants of buildings with threat detection by means of a dynamic interactive emergency evacuation notification system and evacuation protocol utilizing smart exit signage.

BACKGROUND OF THE INVENTION

When the public hears the devastating news about a shooting at a school, business, church, or other public location, it is often determined in retrospect that additional security should have been in place to prevent or minimize the tragedy. However, in order to protect innocent people, security personnel must be able to analyze potential safety risks and institute adequate safety measures before such a tragic event occurs.

Many existing security systems may include general visual and auditory alarms. However, these alarms do not provide the type and depth of information that occupants may need in order to identify the threat area, thereby avoiding or minimizing exposure to the threat. Nor does a common emergency evacuation nomenclature system exist. Therefore, a need exists to provide advancements in the field of security systems for offering clear instructions to the occupants within public and private buildings or other public areas when a threat is detected and preferred building exit routes are desired.

State and federal law require exit signage for many buildings. However, these signs are generally static signs indicating an exit. Most conventional exit signage in buildings are single-faced or double-faced static signs displaying the word 'EXIT' either in red or green and in some cases orange color. When the conditions require, the emergency exit sign is intended to indicate the location of an emergency escape exit to assist occupants with evacuation. The conventional static exit signage typically directs occupants to the nearest exit. However, in emergency situations arising from violence, such as active shooter events, directing occupants to the nearest exit may inadvertently direct occupants toward the threat.

Therefore, a need exists for a dynamic emergency evacuation system and dynamic emergency evacuation signage capable of detecting the location of a threat and directing occupants away from the threat area.

SUMMARY

The present disclosure is directed to systems and method for providing security for a secure area. The present invention also relates generally to illuminated signs such as exit signs having either emergency or non-emergency capabilities and particularly, to an intelligent and dynamic evacuation system to assist building occupants when exiting the building during emergency events. The present invention provides a comprehensive method of threat identification, occupant response, occupant evacuation, and first responder response along with signage incorporating an LED unit, light shielding device and reflective light focusing housing which can overcome the limitations of conventional static exit signs.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
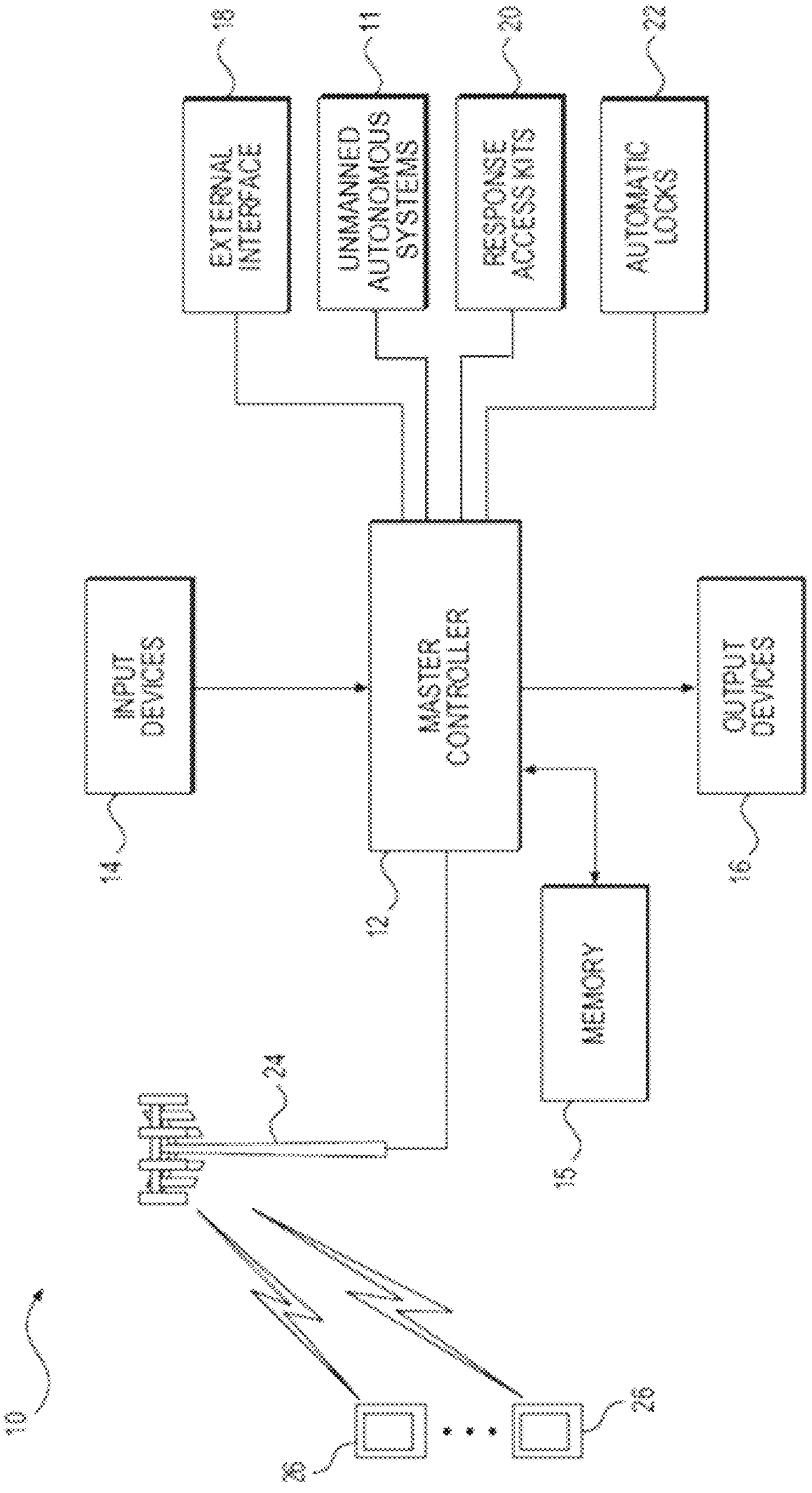
FIG. 1 is a block diagram illustrating a security system that may be installed in a building, according to one embodiment.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated. The terms "top" and "bottom" are used herein refer to the orientation of septa shown in the drawings and to the movement of a needle, which is inserted into the top of a septum, passes through the septum, and emerges from the bottom. It should be understood that a septum may be mounted on a fitting at various orientations, such that the insertion point "top" may be oriented sideways, at an angle, or upside down.

Existing security systems and signage in buildings lack forms of interactive or dynamic emergency evacuation information systems to communicate accurate and immediate information to all parties involved during a security threat. Therefore, systems that can provide real-time information are needed to enact timely and dynamic response plans for those who may be in danger. Also, information should be shared with on-site safety personnel and first responders. For example, in the event of a school shooting, real-time data provided to students and faculty will save lives. Also, dynamic information gathered during a threat can be used by first responders for quickly responding to the threat and injured parties.

The security systems and methods of the present disclosure enable communication of real-time situational information simultaneously to all involved parties instructing them audibly and visually on what to do, where not to go and how to safely exit the building. The systems are capable of communicating reactionary plans within a dynamic emergency situation, which typically requires people to move in a particular direction or toward a designated safety zone and to instruct and direct first responders on where the threat is located. The security systems of the present disclosure may be implemented as an electronics data management and control system, tailored for communication. They may be integrated with many input devices to detect threats as they occur.

The signage utilizes traditional exit signage with enhancements to create a smart exit sign capable of delivering an evacuation protocol message to the occupants of the building and first responders. The EXIT signage is equipped with at least one light strobe, and preferably two strobes (for redundancy), capable of illuminating different colors, preferably red, green and yellow. In other embodiments, the EXIT signage may include multiple strobes, each of a different color. In areas detected near the threat zone, the EXIT signage verbiage changes from green to red and the light strobes alternately strobing a red warning. An audible speaker instructs the occupants they are in the immediate area of the threat and communicates instructions, such as "shelter-in-place immediately". The EXIT signage in areas further from the threat and deemed suitable for evacuation remains green and the light strobes alternately strobe green and an audible speaker instructs the occupants to follow the green EXIT signage and green strobing to an evacuation area. EXIT signs in the areas suitable for evacuation which lead to the threat area will have the backlit EXIT sign darkened or turned off and at least one, preferably two strobing lights of color (preferably yellow) will be activated. This warns the occupants to not go in that direction and provides first responders with directions toward the threat and or injured occupants. The directional arrow indicators on the EXIT signage can also be independently controlled to be turned off, flash, or change color to provide additional evacuation information.

In addition to the smart EXIT signage which replaces traditional exit signage, supplemental smart signage may be incorporated in the security system. This smart signage will not have EXIT verbiage on the face of the sign and will be equipped with important communication features such as strobes and/or speaker(s), camera, and microphone to provide or acquire additional information during a threat event. This signage may also be utilized in a building retrofit system in which the existing static signage is not replaced, but supplemental signage utilizing the strobe light exit nomenclature and audible emergency instructions described herein is attached to or located near an existing static exit sign.

In addition to the smart EXIT signage which replaces or retrofits traditional exit signage, a supplemental hallway intersection signage may also be incorporated into the security system. This smart signage is attached to or hangs from the ceiling and incorporates strobes directing light down each hallway. The strobes indicate the preferred exit route with red, green, and yellow (or other colors) as described herein. The bottom of the sign has illuminated directional arrows indicating the preferred exit route.

The smart signage is connected to a master controller via direct electrical or cellular connection, Wi-Fi, etc. and may contain sensory input devices, cameras, microphone, speaker, one or more strobe lights, and one or more knockouts for additional input devices or output devices.

In operation, the security systems of the present disclosure are able to identify and track the location of a threat. That information is shared simultaneously to all affected parties using various means to communicate. Some elements of communication may include smart-enabled directional exit signs, color indicated "EXIT" wording or other language or symbols providing similar information, color-indicated strobe light indicators, push alerts via smartphones, highlighted exit maps, announcement speakers and GUI to external first responders.

Emergencies are known to be unpredictable and affecting large groups of people. Based on an analysis of a threat, the systems may require that selective groups take shelter in their present location and that others evacuate their present location. The security systems, according to some embodiments, may communicate the situational emergency response and directives to all parties in real-time to optimize the best course of action. If the threat moves, crowd management may also change accordingly (e.g., exit left, exit right, or shelter-in-place).

In addition to threat detection and evacuation, the security systems are also configured to identify and communicate threats before a situation becomes critical. This kind of deterrent is done through various means, including facial recognition software, license plate/car recognition, and facility entrance management. The systems may also monitor noise levels that may be associated with escalating events prior to crisis situations. A master controller of the security system may be connected to facility lighting, door locks, and other pertinent items for control and communications. The master controller can also receive inputs from a number of other human interfaces, such as FOB buttons, smart phones, key-word recognition, etc. Depending on the authority levels of the different human interfaces, the total count of inputs, and the proximity of the inputs to "ground zero," the master controller can respond to various inputs according to a predetermined plan.

Regarding response measures, the security systems may also be configured to allow access to secure emergency response kits containing lethal and/or non-lethal weapons and/or emergency medical supplies for designated individuals. Weapons and other protective emergency items may be staged for controlled access within designated secure limited access kits. The location and access-status of such kits can be shared with all involved parties, based on pre-arranged security plans.

The accessing of the secure emergency response kits is accomplished through a variety of secure methods, such as key pads, fingerprint/handprint identification, retina identification, etc. or a combination of methods. Access of the secure emergency response kits sends notification to the master controller activating appropriate response actions.

The inclusion of smart signs with Wi-Fi or other means of wireless communication enables the security system to track persons and objects installed with radio frequency identification (RFID) chips tracking devices. Law Enforcement and emergency personnel entering the building can be tracked and through GUI, emergency dispatch can identify where emergency personnel are located in real-time in the building. Weapons and emergency medical equipment contained in the secure emergency response kits equipped with RFID tracking devices can be tracked throughout the building, providing law enforcement information and emergency medical responders with location information on injured occupants.

The security systems described herein include a master controller capable of sensing, communicating, and controlling items that are used to enhance survival in emergency situations. Information shared by the master controller can be tailored to the various parties that are involved. For example, students may simply receive instructions regarding the direction to exits and shelter. Teachers, faculty, and first responders may receive information regarding the location and access to emergency weapons. First responders may receive all available information that the master controller may provide, including information regarding the location of the student population. The following are elements of the security systems designed to identify, discourage, prevent, and react to potential threats against persons and property in a public building or venue.

FIG. 1 shows, according to one embodiment, a security system 10 that may be installed in a building or group of buildings, such as a school, university building(s), church, synagogue, office building(s), hospital, mall, government facility, event center, stadium, retail store, retirement community, fitness center, theater, hotel, airport, subway, or other public building. In some embodiments, the security system 10 may be installed at an outdoor location where a group of people might gather, such as at an open-air concert, fair, amusement park, resort, street festival, theme park, gated community, neighborhood, ball field, etc. The security system 10 may also be installed temporarily or permanently in the locations where security for a group of people is to be monitored.

The security system 10 includes a master controller 12, which receives signals from one or more input devices 14. The master controller 12 may be configured as a computer system, one or more processors or microprocessors, a server, etc., for controlling the operations of the security system 10. The master controller 12 may be a server located on-site or may be located off-site and configured to monitor a number of buildings. In addition to the on-site storage and control, the security system 10 may include back-up storage and general control capabilities that can be mirrored off-site. The master controller 12 may be a remote service and include cloud computing for accessing and processing input data related to threat detection. The master controller 12 may include back-up battery power to allow operation during certain types of emergencies.

The input devices 14 may be incorporated into exit signage, as discussed in connection with FIG. 3, may be clustered into groups of similar or dissimilar devices, or may be standalone devices. The input devices 14 may include sensors for sensing events that may be determined to be a threat. The input devices 14 may include audio sensors (e.g., microphones) for detecting particular sounds or noises, such as the sound of a gunshot, a person's scream or key words. For example, the particular sound characteristics of a gunshot, a scream or key words programmed into voice recognition software run by the master controller 12. Detection of such sounds by the input devices 14 may be utilized by the master controller 12 as an indicator that a threat has been detected.

The input devices 14 may also include cameras for obtaining facial features of people entering a building or located on the premises. The facial features can be further analyzed by the master controller 12, by using facial recognition software, to identify people who may be detected as being a possible threat. The input devices 14 may include additional cameras for obtaining license plates of vehicles entering the premises of a monitored location. License plate information can be analyzed by the master controller 12 and compared with a database to determine if a vehicle licensed to a person who may possibly be a threat has driven onto the premises.

Furthermore, the signage and standalone or clustered input devices 14 may also include manual components (e.g., switches, buttons, keypads, etc.) that a person can use to manually enter a warning of a potential threat.

In some embodiments, input devices 14 may include microphones or other sound detectors for detecting spoken speech, where the master controller 12 may be configured to recognize a particular voice or a particular keyword that is spoken. The voice or keyword may be used when a potential threat is detected by an authorized person and he or she wishes to verbally activate a warning of the potential threat. In certain embodiments, the input devices 14 may further include smoke detectors and/or heat detectors for detecting fire. In further embodiments, the input devices 14 may also include weather sensors (e.g., anemometers, barometers, seismometers, etc.) that can detect tornadoes, hurricanes, earthquakes, or other natural phenomenon that may be a threat to people. The input device 14 may further include receiving equipment for receiving warnings of inclement weather from a reputable weather service.

The input devices 14 may also include cameras that can capture images of people and/or activities that may be analyzed by the master controller 12 as being possible threats. The cameras may include security cameras, fisheye cameras, surveillance cameras, infrared cameras, thermal cameras, x-ray cameras, light intensity sensors, and other cameras as known in the art. The cameras may be used for detecting images of people, detecting heat from flames, detecting hidden weapons, detecting unusual thermal patterns, detecting light and heat from firearm discharge (e.g., muzzle flash detectors), and other indicators of potential threats and hazards.

The signage, standalone or clustered input devices may contain a variety of other sensory devices, such as glass breakage detector, heat sensor, motion sensor, carbon monoxide sensor, hazardous gas sensor, low oxygen sensor, Wi-Fi and Wi-Fi repeater, battery, battery charger, geotracking, etc.

Input signals from the one or more input devices 14 are provided to the master controller 12, which is configured to process these signals appropriately in order to detect potential threats. The master controller 12 may include or have access to memory 15 or a database for storing data. The memory 15 may include one or more databases.

Also, the memory 15 may include software and/or firmware that is configured to enable the master controller 12 to perform threat analysis algorithms based on the input data received from the input devices 14. In some embodiments, database look-up may be internal to the master controller 12 and/or may link up with external libraries. The memory 15 may include non-transitory computer-readable media for storing logic, software, computer instructions, digital commands, etc., for enabling the master controller 12 to perform functions for detecting whether or not certain events can be identified as possible threats to the safety of the inhabitants of the building. If the master controller 12 determines that a potential threat is present, the master controller 12 is configured to provide any number of responses for leading people out of danger and providing information that may be crucial for the survival or safety of the inhabitants.

The memory 15 associated with the master controller 12 may include schematics, blueprints, floor plans, etc. of the building or region that is being monitored by the security system 10. Also, the memory 15 can store information regarding hallways, thoroughfares, pathways, interior doors, exterior doors, doors that can be automatically locked, exits, window locations, secure shelters, etc. These features of the building represent zones where people may travel to get from one location in the building to another or to leave the building. Furthermore, the memory 15 may include a crowd movement algorithm that is configured to enable the master controller 12 to determine which direction a crowd of people in each location should move in order to remove themselves from danger. This determination may be made in real-time based on real-time input data received from the input devices 14. The crowd movement algorithm can be dependent on the layout of the buildings, the location of detected threats, and safe zones where people can move to in order to avoid the danger.

Therefore, from information obtained from the input devices 14, the master controller 12 can detect whether a threat is present and can detect the location of the threat. The master controller 12, in real time, through the input devices 14, can also detect the movement or spread of the threat. Therefore, instructions to the smart signage for moving crowds may be updated in real time based on the movement or spread of the threat. The master controller 12 can also determine the safest actions that people may take, then provide outputs to the smart signage providing instructions on how to best to avoid or escape danger. Some actions may include instructions, via illumination of red EXIT and red and/or yellow strobing lights and verbal instructions from the smart signage for a specific group of people to stay put, hide, or seek shelter within their current location, which may be the best course of action in a situation where a threat (e.g., a shooter) is in the same room as that specific group of people. The master controller may determine that locations not adjacent to the threat (e.g., shooter) are safe to evacuate and determine the most appropriate action is for occupants to flee from the source of danger and activate green strobing lights and verbal instructions from the smart signage.

In some embodiments, the master controller 12 may determine when a threat or a potential threat is detected and then, in response to making such a determination, record information into the memory 15. For example, the master controller 12 may record audio, video, still images, time signatures, etc. into the memory 15. This information can be used at any time for providing evidence of threats or potential threats and/or can be used to modify how the master controller 12 identifies threats.

The input devices 14 may include microphones or other audio sensing devices for sensing an event that can trigger the detection of a threat. Such devices allow the master controller 12 to electronically and instantaneously monitor for certain sounds, such as the sound of gunshot or the sound of a scream. The master controller 12 can utilize certain frequencies or frequency patterns and/or volume (or decibel (dB)) levels to trigger a detected threat. Based on which microphone(s) detect the sounds, or the comparative volume of the sounds detected by different microphones, the master controller 12 can immediately determine the location of the threat. Some input devices 14 may be configured to receive feedback regarding the status of doors and windows, such as whether the doors and windows are opened, closed, and/or locked. Other input devices 14 may receive input about other security checks, some of which can show a failed status, such as the recognition of an unauthorized vehicle or person in a secure area and/or an unauthorized access attempt to restricted areas, lock-boxes, etc.

When the master controller 12 receives signals from the input devices 14 and analyzes the signals to determine if a legitimate threat exists and where the threat exists, the master controller 12 further determines how to respond to the threat. Then, the master controller 12 can provide signals to one or more output devices 16, which are used to warn people of the threat and how to react to the threat.

The security system 10 may include any types of output devices 16 for communicating information to people in the building where a threat or potential threat has been detected. For example, the output devices 16 may include audible components, such as speakers, alarms, sirens, etc., and/or may include visual components, such as closed-circuit television screens, computer displays, smart phone displays, warning lights, activate strobe lights on the smart signage, change the EXIT verbiage on the smart exit signage from green to red and/or darken, change the directional indicators from green to red and/or darken, programmable signage, etc. In this manner, smart signage is an output device 16, as it conveys information via verbiage or symbols on the sign, and smart signage may also include other output devices 16, e.g., speakers, strobe lights, etc., within the housing of the signage.

The output devices 16 may include control devices that are configured to operate with systems already in place in a building. For example, the control devices, in response to detection of a threat, may be configured to flash the overhead lights in the rooms of the building or produce sounds through an intercom or speaker system that is already installed in the building. Some sounds may be intended as a distraction, such as a voice, a simulated gun fire, drone sound, emergency vehicle sound, etc.

The output devices 16 may cooperate with the master controller 12 to provide location-specific output. For example, an output device may display a specific location (e.g., "you are here"), based on GPS coordinates or other methods, to indicate the location of the device or person/people near the device on a map or floor plan.

The output devices 16 may include audio/visual alarms, lights having different colors, lights that flash, sirens, smart phone, computers, tablets, speakers, closed-circuit television screens, etc. In some embodiments, the output devices 16 may also include control mechanisms for controlling locks, gates, windows, etc. The output devices 16 may be linked, according to some arrangements, to off-site emergency agencies, such as police, first responders, contracted service companies, etc.

In some embodiments, the output devices 16 may include one or more exit signs, as described in more detail below with respect to FIG. 3. In some embodiments, the output devices 16 may include one or more beacons, as described in more detail below with respect to FIG. 4.

In some embodiments, the security system 10 may include one or more devices that include both input devices 14 and output devices 16. For example, smart exit signs may also include microphones and cameras for detecting sound and images in addition to providing exit strategy instructions. The input devices 14 and output devices 16 may be packaged together or may be separate, depending on various strategies for optimizing the system. For example, a smart exit sign may contain microphones, speakers, and lights controlled by a micro-controller, and the micro-controller may accept input from one or more tethered or linked microphones that are not part of the exit sign assembly. The input and output devices 14, 16, when used together, may include microphones and speakers to allow people to speak directly to one another or to other networked devices, similar to a two-way intercom system.

Information regarding a detected threat can be shared with faculty, students, on-site security personnel, off-site security personnel, police, etc. The amount of information shared with various people may depend on the roles that each person plays regarding security. For example, police would normally receive the highest amount of information in order that they can respond appropriately to any detected threats. On the other hand, students may be given only enough information for their own personal safety. In some implementations, the system 10 may allow certain individuals to register to receive information about threats occurring in the building. For example, parents can subscribe to the security system 10 to receive limited information regarding safe accountability of each student, best gathering areas, updates, instructions, etc.

The security system 10 also includes an external interface 18 that is connected to the master controller 12. The external interface 18 may include communication components for communicating threats to appropriate first responders, such as police or fire departments, such as, for example, a means for electronic communication between the master controller 12 and a computing device operated by police or fire departments via the internet. The external interface 18 may also communicate specific instructions to first responders depending on specific details of the emergency. For example, in some situations, it may be desirable to instruct police to come to the building as soon as possible, but avoid sirens when they are near the building. The external interface 18 may be configured to communicate with police departments, fire departments, paramedics, doctors, and/or other departments or specialists.

The security system 10 may also include one or more unmanned autonomous systems 11 in communication with and controlled by the master controller 12. Unmanned autonomous systems 11 may include, for example, robots, drones, deployable trackers, mobile cameras, and mobile communications systems. Some embodiments of unmanned autonomous systems 11 may include zip lines, cable lines, or other devices for allowing equipment to be moved into dangerous areas for obtaining information about the threat or resolving a threat without placing human life in harm's way. Mobile tethered hybrid drones with untethered capabilities may be used for exterior surveillance and countermeasures against threats. The drones may be used on buses for scheduled bus transport, scheduled coach transport, school transport, private hire, tourism, promotional buses for political campaigns, privately operated buses, band tour vehicles, etc. Rail drones may be used in interior surveillance and countermeasure situations, such as on scheduled bus transport, scheduled coach transport, school transport, private hire, tourism, promotional buses for political campaigns, privately operated buses, band tour vehicles, etc.

The security system 10 may also include one or more secure emergency response access kits 20 that are located in the building. In some embodiments, the response access kits 20 may include access to items within the kits only in the event of a threat. As such, the master controller 12 may be configured to send an electronic signal to the response access kits 20 to allow the kits to be opened. Otherwise, when no threats are present, the response access kits 20 may remain locked.

The response access kits 20 may include lethal and/or non-lethal weapons (e.g., guns, Tasers, mace), emergency survivor supplies, dedicated communications equipment for sending signals to emergency personnel, and other supplies as may be needed in the event of various types of threats. The response access kits 20, or security kits, may contain (RFID) tracking devices in communication with the master controller 12 and/or a network. The tracking devices may be attached to lethal and/or non-lethal weapons or emergency supplies to track the location of such devices once deployed.

The response access kits 20 may include a radio frequency identification (RFID) reader that only allows authorized users to open the kits 20 with a corresponding RFID chip. Thus, only authorized users carrying the appropriate RFID chip may access the supplies in the response access kits 20. In some embodiments, the response access kits 20 may include a fingerprint recognition sensor or other biological sensor to enable only certain people to open the kits. Secure access may be controlled by any number of processes, such as RFID, biometrics (e.g., fingerprint scanner, retinal scanner, voice recognition, key pad, or other integrated technology).

According to some embodiments, an authorized person may open one of the response access kits 20 when he or she determines that a threat is present, but before the input devices 14 detect an event that triggers the master controller 12 regarding a potential threat. The system 10 may be configured such that, in the scenario of the authorized person initiating a threat identification, the opening of the response access kit 20 may cause a signal to be sent to the master controller 12 to further trigger a detected threat event.

In some embodiments, the security system 10 may further include automatic locks 22. The master controller 12 may be configured, based on a threat and known location of the threat, to automatically lock certain doors, gates, or other passageways to cordon off certain areas of the building. In this way, the master controller 12 can either lock a perpetrator in an otherwise unoccupied room or lock a perpetrator out of rooms that are occupied. Also, the security system 10 may include door status feedback (e.g., opened, closed, locked), which can assist the master controller 12 in determining if all doorways are in compliance with the specific safety plan in effect. For instance, the master controller 12 can determine if designated doors are closed and in their proper locked configuration during certain hours or based on an alternative emergency plan.

The security system 10 may utilize a wireless communication transmitter/receiver 24 for wirelessly transmitting emergency signals to portable electronic devices 26, such as smart phones, tablets, etc. and for receiving signals from the portable electronic devices 26 regarding information that can be used to determine the existence or location of a threat. In some embodiments, the wireless communication transmitter/receiver 24 may be part of the security system 10 itself and located on the premises where the building is located. In other embodiments, the wireless communication transmitter/receiver 24 may be a remote tower (e.g., cellular tower). The wireless communication transmitter/receiver 24 may utilize cellular service equipment and/or may include transmitting equipment for transmitting wireless signals via other wireless protocols, such as Wi-Fi, Bluetooth, etc.

The master controller 12 can send signals to the wireless communication transmitter/receiver 24 that can be transmitted to a number of recipients. Some of the recipients may include the people who currently inhabit the building. The signals may be specifically designed to apply to a person or people based on their location or zone within the building. The signals may also be used to instruct the person or people to evacuate the building, move to another part of the building, shelter in their current location, or other instruction.

Updates regarding a threat may be communicated from the portable electronic devices 26 to the wireless communication transmitter/receiver 24. For instance, if a student witnesses the movement of a perpetrator, the student can send a signal via the portable electronic device 26 to the wireless communication transmitter/receiver 24 that indicates that the perpetrator has been located near the location where the signal was sent. Other information can also be communicated from the portable electronic devices 26 to the wireless communication transmitter/receiver 24. This information is forwarded to the master controller 12, which can then analyze the new signals and update the status of the threat. In some embodiments, an emergency button or a phone app may be included in the portable electronic device 26, allowing the user to push a message to notify law enforcement (or other emergency agency) and/or activate off-site monitoring to engage a mobile tethered hybrid drone and/or rail drone for threat counter response.

When the master controller 12 detects a threat, the wireless communication transmitter/receiver 24 of the security system 10 is configured to provide a push notification to the smart phones or other portable electronic devices of people who are subscribed to receive notifications. In some embodiments, notifications may be sent to anyone in the general vicinity of the building. In a sense, the push notification may be similar to an amber alert or storm warning and used to notify people in the area of the threat.

In some embodiments, the master controller 12 may be configured to instruct the wireless communication transmitter/receiver 24 to communicate to other people who are related to a person or people known to be in the building. For example, if the security system 10 determines that a student has moved away from a threat, the wireless communication transmitter/receiver 24 may send a message to a parent indicating that a threat has been detected in the student's school and that the student has moved to a safe location. The location of individual students or groups of students in danger can be communicated to the involved parties, such as parents, teachers, first responders, etc. Selective information sharing strategies can be customized for each client.

Figure 2:
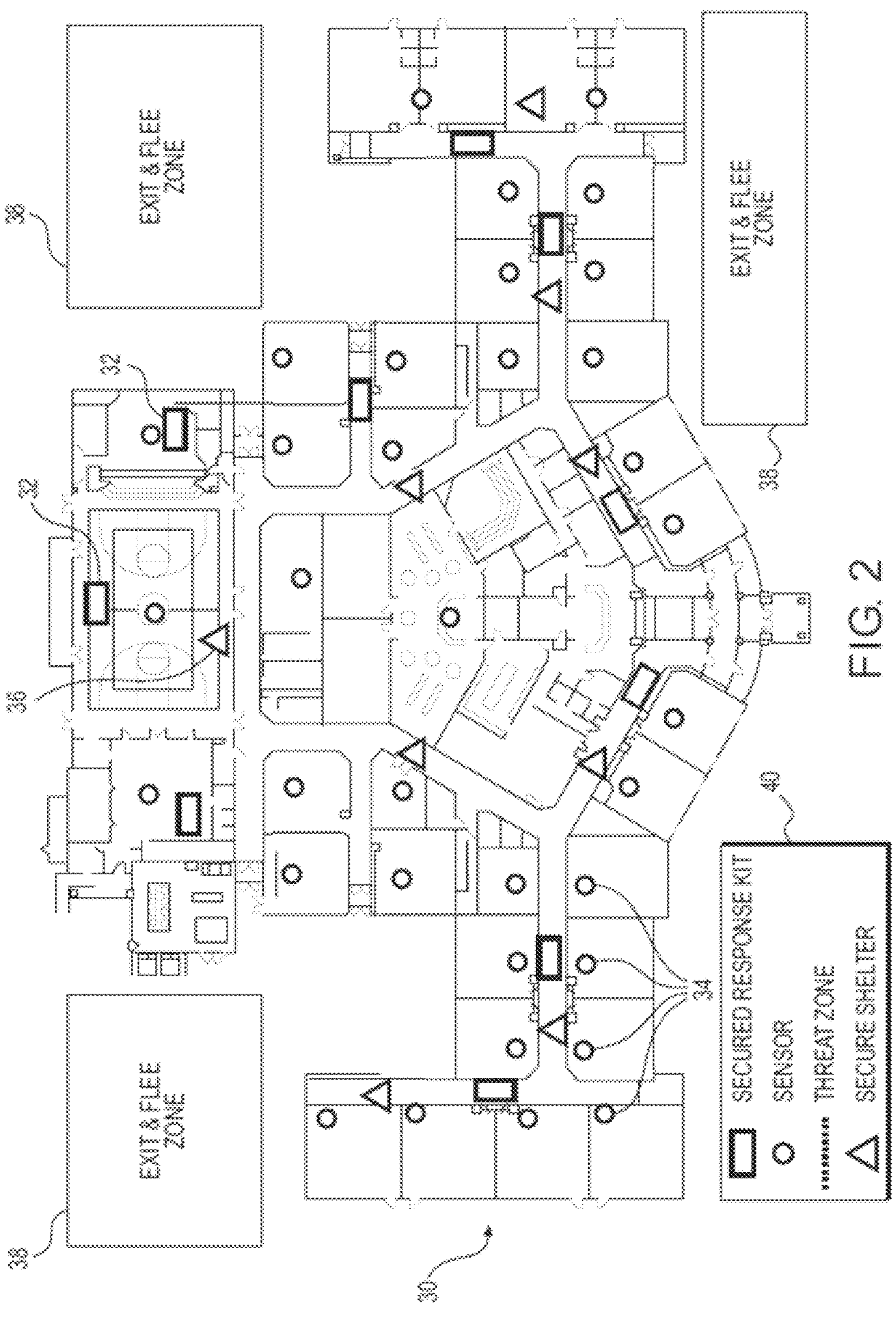
FIG. 2 is a schematic diagram illustrating an exemplary floor plan of a building, such as a school, where the security system of FIG. 1 may be installed.

FIG. 2 is an exemplary floor plan 30 of a building, such as a school, where the security system 10 of the present disclosure may be installed. Images of the floor plan 30 may be stored in memory 15. During installation of the input devices 14, output devices 16, and response access kits 20 throughout the building, location information is stored for each device. For example, the response access kits 20 (or secured response kits 32) are shown as rectangular shapes on the map. Also, the location of sensors 34 (i.e., input devices 14 and output devices 16) are shown as circles on the map, preferably located within each room of the building. The floor plan 30 also includes the locations of secure shelters 36, shown on the map as triangles. The map also include exit and flee zones 38 where occupants can flee if an emergency arises. A legend 40 identifies the meaning of the various shapes on the floor plan 30 to the reader.

Also, during the installation of the security system 10 within the building, the orientation of the output devices 16 may be stored in memory 15, such that directional information can be determined from the output devices 16. For example, if an exit sign having left and right arrows is installed over a doorway leading out to a hallway, the orientation of the exit sign is known such that directional instructions can be provided to people exiting the room to head in one particular direction (e.g., left). In this example, the smart exit sign may illuminate an arrow pointing in the desired (e.g., left) direction and/or darken, de-energizing the right arrow indicator.

Furthermore, information of the floor plan 30 can be transmitted to subscribers having electronic devices (e.g., computers, smart phones, etc.) in communication with the security system 10. If no threats are present, the floor plan information may appear as shown in FIG. 2. As shown below with respect to FIGS. 6-8, the floor plan information may further include threat information related to a detected or potential threat. The threat information may include location information, threat movement information, and threat type information (e.g., shooting, fire, tornado, etc.). The threat information may be visually overlaid on the floor plan 30 on the display screen of the electronic device to show the location of the threat or zones near the threat where people need to be most vigilant. Also, with threats detected, exit direction information may also be displayed on the display screen of the electronic device.

The sensors 34 shown on the floor plan 30 may represent microphones for detecting when a trigger event (e.g., noise of gunfire, noise of scream, etc.) is detected. The microphones may be standalone devices or may be integrated into equipment of the security system 10 that is installed throughout the building, such as the smart exit signs, supplemental exit signs and the hallway intersection exit sign. For example, some microphones may be integrated into exit signs, beacons (described below), or other devices.

In some embodiments, emergency drills may be conducted to prepare people for responding to threats. In this respect, the emergency drills may include providing signals to the output devices 16 and direct people to stay put, find shelter, exit, etc. The map of FIG. 2 may be used to assist people during these drills.

FIGS. 3A-3L illustrate several embodiments of instructional signs for communicating potential threat information to occupants. According to some embodiments, one or more of the output devices 16 of the security system 10 may include the enhanced smart exit signs shown in FIGS. 3A-3L, and input devices 14 may be incorporated into such signage.

Figure 3A:
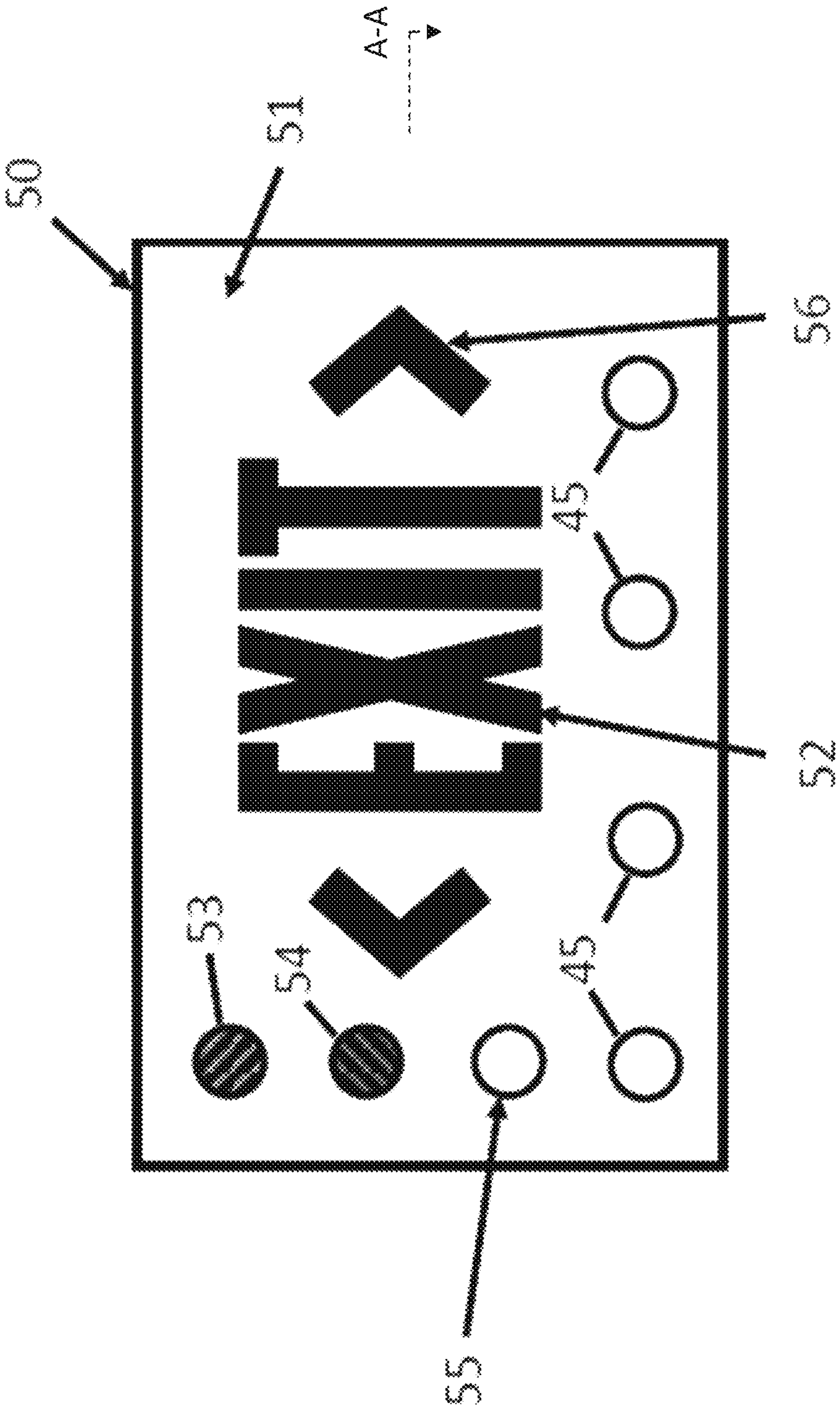
FIG. 3A is a front view of a dynamic exit sign.
Figure 3B:
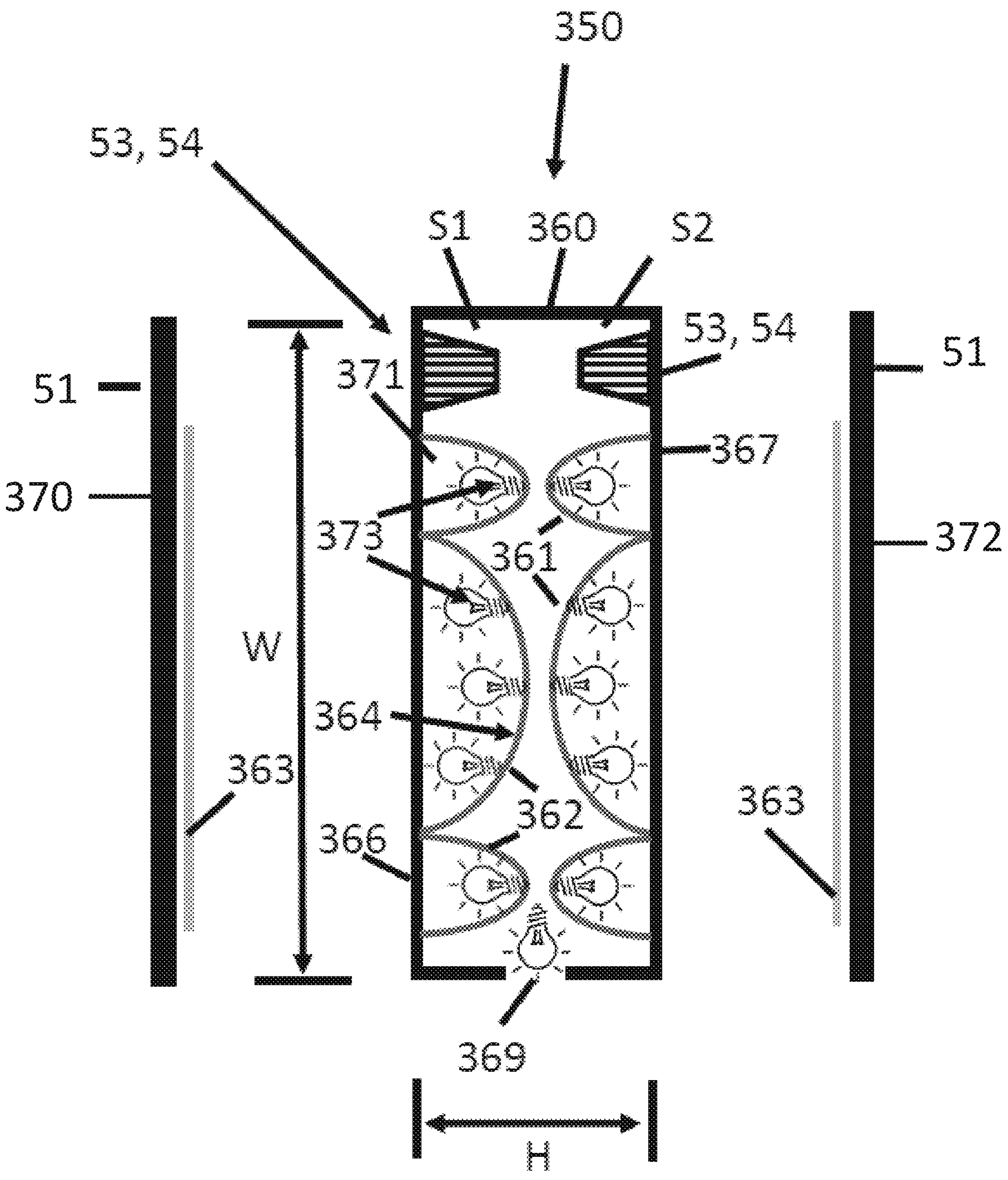
FIG. 3B is a top sectional exploded view of a double-faced dynamic exit sign along line A-A of FIG. 3A.
Figure 3C:
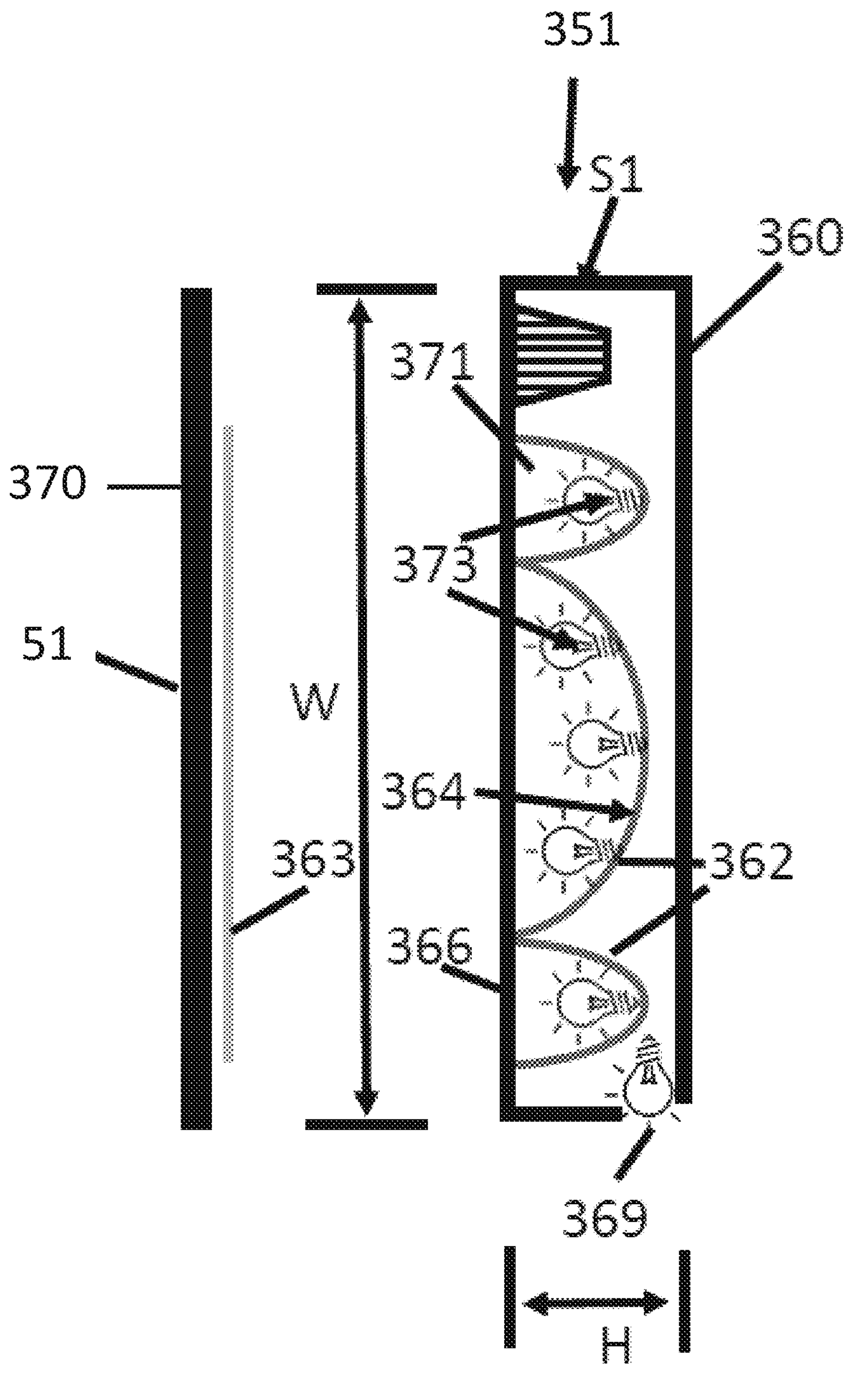
FIG. 3C is a top sectional exploded view of a single-faced dynamic exit sign along line A-A of FIG. 3A.
Figure 3D:
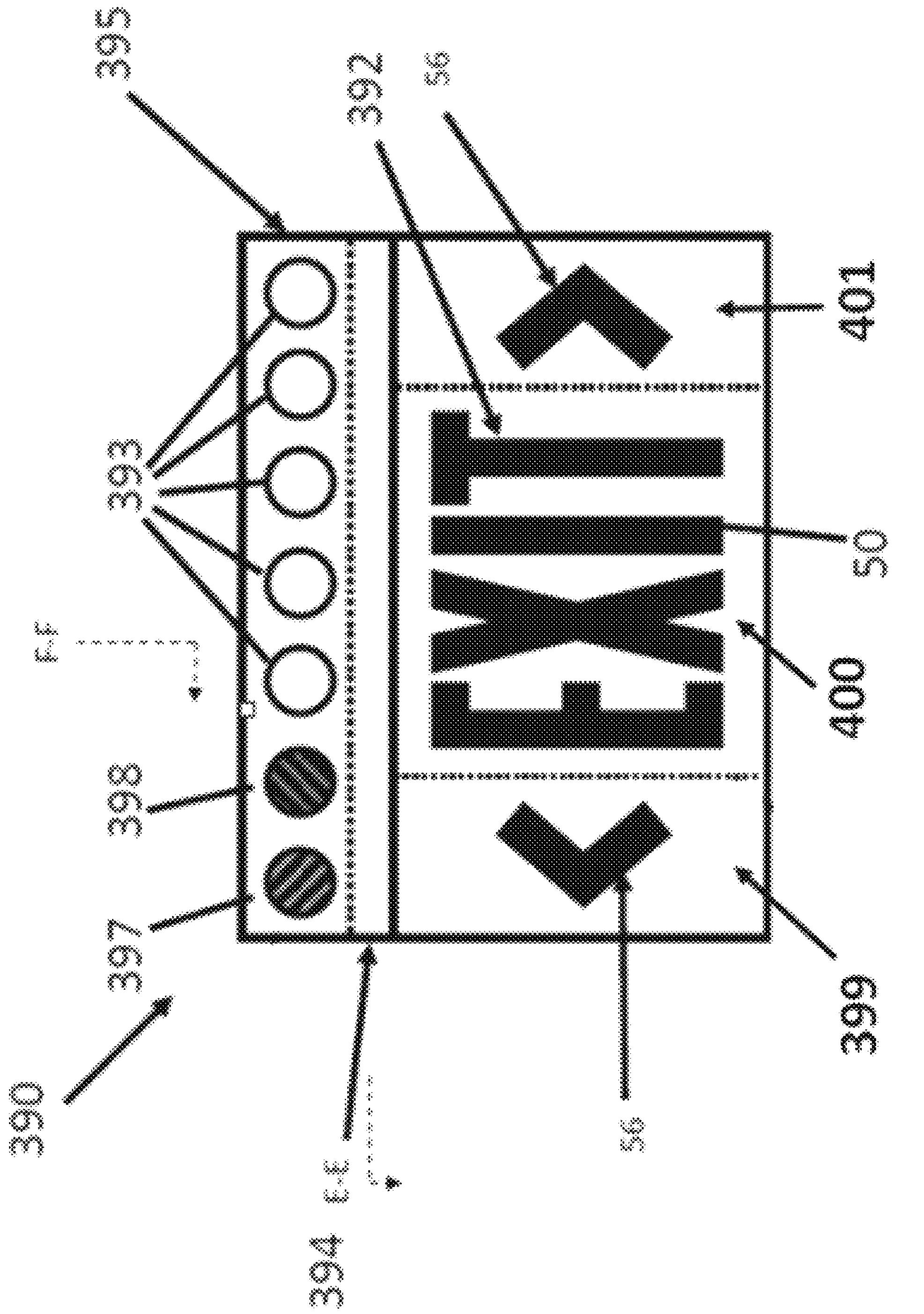
FIG. 3D is a front view of an alternate embodiment of a dynamic exit sign.
Figure 3E:
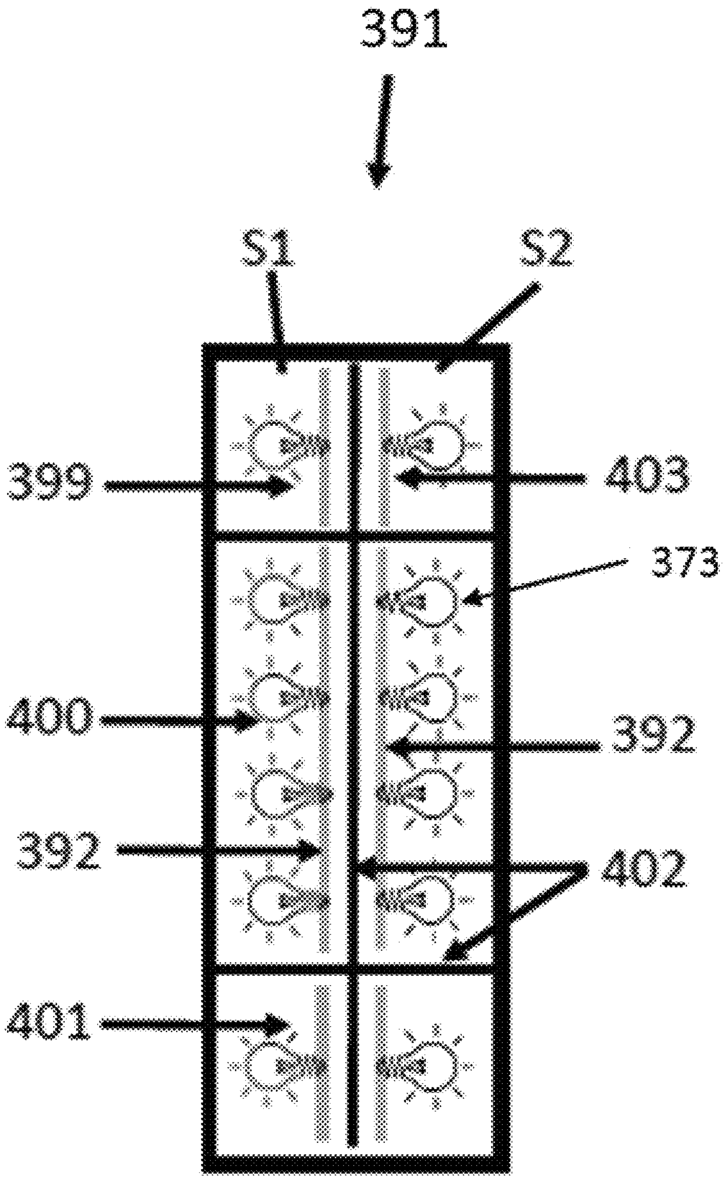
FIG. 3E is a top sectional view of the alternate embodiment along line E-E of FIG. 3D.
Figure 3F:
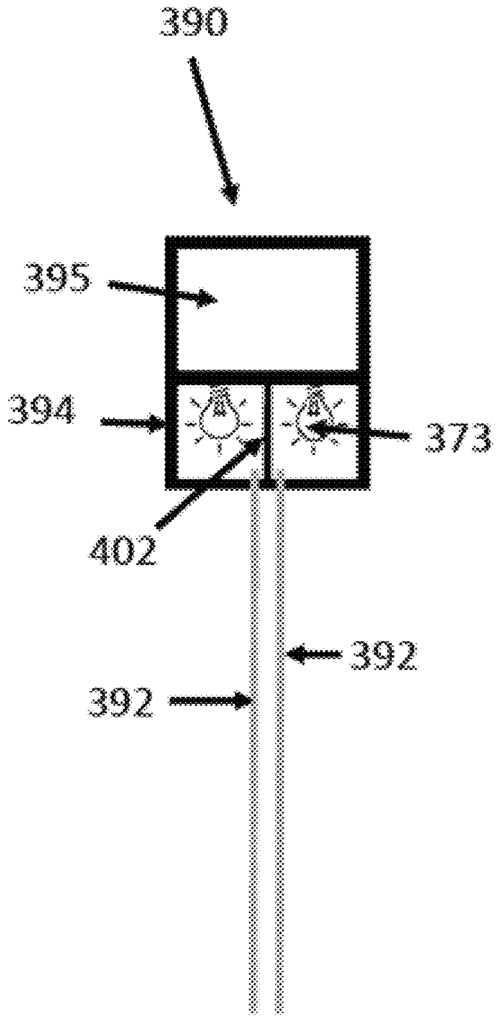
FIG. 3F is a side view of a double-faced version of the alternate embodiment with the lighting section shown in sectional view along line F-F of FIG. 3D.

FIG. 3A is front view of a smart exit sign 50. The smart exit sign 50 may include a single face 51 on a single-faced exit sign 351, the opposite sign lacking lighting, or may include two opposing faces 51 on a double-faced smart exit sign. In some embodiments, the face 51 of a single-faced smart exit sign 351 and double-faced smart exit sign 350 would be identical, therefore FIG. 3A displays a front view of both types of smart exit sign 50 (i.e., single-faced sign 351 and double-faced sign 350). FIGS. 3B and 3C respectively depict the interior workings of double-faced smart exit sign 350 and a single-faced smart exit sign 351. Each face 51 may include an exit indicator 52, which may read "EXIT" in any language, or provide another word or symbol indicating egress (e.g., in some countries, it is common to use a symbol of a running person instead of a word). Also, on the face of the sign 51 is at least one strobe light (and in some embodiments, two or more) with the ability to change colors. When the master controller 12 determines, based on the position and orientation of the smart exit sign 50 and the location of known threats, light sources 373 may change colors displaying the changed color through the exit indicator 52 to indicate the proximity to the threat, preferably red or green, and the strobe lights 53, 54 would activate, preferably alternately strobing, and depending on the threat location in relation to the building preferably strobe colors red, green, or yellow. In a non-emergency operation, the exit signs 50 would function as traditional exit signs and preferably the exit indicator 52 and directional arrows 56 would be green in color. As example 1, in a threat mode in which the master controller 12 has determined the threat is in close proximity to the occupants, the exit indicator 52 for a single and/or double-faced sign may turn red and the strobe lights 53 and 54 may flash red, warning the occupants that they are in imminent danger and should take appropriate actions, such as sheltering in place. As example 2, in areas the master controller 12 determined were safe to exit the building, the signs 50 leading away from the threat would maintain the exit indicator 52 and the master controller 12 may activate green and strobes 53 and 54 directing occupants away from the threat. As example 3, in areas the master controller 12 determined were safe to exit building the master controller may dis-illuminate/darken the exit indicators 52 leading toward the threat and may activate yellow strobe lights 53 and 54 warning occupants from going in this direction and providing intel to first responders on routes to the threat area.

FIG. 3A smart exit sign 50 may also incorporate input devices and output devices. In one embodiment, an output device in smart exit sign may be a speaker 55. In non-emergency the sign 50 and speaker 55 can be used for non-emergency communications. In emergency situations the speaker 55 can be used to provide and reinforce the emergency protocols and provide life-saving information to the visual impaired, such as, for example, "shelter-in-place immediately," "follow the green indicators to safety," or "caution do not enter."

FIG. 3A smart exit sign 50 also includes left and right directional arrow indicators 56 which can independently be dis-illuminated, flash and/or change color based on the instructions from the master controller 12 to direct occupants away from the threat and first responders to the threat.

FIG. 3A smart exit sign 50 also incorporates knockouts 45 for installation of either input devices or output devices. Knockouts may be located on the sign face 51, sides, bottom or top of the sign 50. Knockouts are portions of the sign housing which may be removed such that sensors or devices located within the sign 50 may have access to the outside environment.

FIG. 3A smart exit sign 50 also incorporates an interface attachment mechanism (preferably internal to the signage housing) for connecting of input interface which enables input devices or output devices to be plugged into and allows the master controller 12 or the Wi-Fi system to be plugged in to. The smart exit signage 50 performs like conventional static exit signage until the interface is attached to the interior of the smart exit signage 50 body.

FIG. 3B is a double-faced smart exit sign 350 having either emergency or non-emergency capabilities. The double-faced smart exit sign 350 is configured to control each face 51 separately and independently. The double-faced smart exit sign 350 includes a housing 360 that has a thickness H and width W, and is defined by a first section designated as S1 and a second section designated as S2. The first section S1 and second section S2 incorporate light barriers 361 and 362, which represent the interior surface of the reflective light focusing housings, having a reflective surface 364 that are disposed within the housing 360 and as illustrated, generally extends within the housing 360 along the width W of the housing 360 and said light barrier located in S1 and S2. The light barriers 361, 362 divide respectively divide S1 and S2 into separate center sections and end sections located on opposite sides of the center sections.

As illustrated in FIG. 3B, the first and second sections S1, S2 of the double-faced smart exit sign 350 are symmetrical. As such, only the first section S1 will be described, it being understood that the second section S2 has the same components as S1. FIG. 3C depicts a single face sign 351, and has only the components of S1, and a housing 360 with a comparatively smaller thickness H as compared to the double-faced smart exit sign 350.

As illustrated, the housing 360 is preferably rectangular. A first sign face 51 is coupled or incorporated in manufacturing to a first surface 366 of the housing 360, the first surface 366 representing the front surface of the first section S1. A second sign face 51 is similarly coupled or incorporated in manufacturing to a second surface 367 of the housing 360, the second surface 366 representing the front surface of the second section S2. The first and second sign faces 51 have exit indicators 52 which include symbols, letters or patterns that can be used to mark emergency exits. As should be understood, the exit indicator 52 on each face 51 is prominently presented to viewers when their respective sections S1 or S2 are illuminated by the light sources 373 in those sections.

As illustrated in FIGS. 3B and 3C, the first section S1 includes a reflective light focusing housing 364 to minimize interior housing light absorption, minimize heat and maximize illumination, i.e., enhance efficiency, and an independently controllable light source 373 for illuminating the first sign face 370. As described, the housing 360 and more particularly, the light barrier 362 is light non-penetrable such that when the light source 373 in the first section S1 is illuminated, and the light source in the second section S2 is not illuminated, the second section S2 and the second sign face 372 form a dark or non-display area, or have the ability to change colors or flash.

As illustrated, in FIGS. 3B and 3C the interior of the face 51 has opaque and non-opaque portions. The non-opaque portions may have a reflective surface, such as, for example, reflective film 363, so as to redirect light originating from the light source 373 back to the interior reflective surface 364 which then reflects the light back to the face 51 and exit indicator 52 thereon to minimize interior housing light absorption, minimize heat and maximize illumination, i.e., enhance energy efficiency.

As illustrated in FIGS. 3B and 3C, the housing contains at least one strobe light 53 and preferably two strobe lights 53, 54 per sign face. The strobes lights 53 preferably have the capability to change color and act in coordination with the light sources 373 during an emergency to communicate emergency evacuation protocols.

As illustrated, in FIGS. 3B and 3C the sign housing 360 contains independent light barriers 362 as or both the exit sign lettering and the directional arrow indicators 371. The characteristics and functions of the directional arrows, et. al. are the same as the light barrier for sign lettering or symbols section. In some embodiment, a hallway or room illumination light 369 as can be independently energized or deenergized by the master controller.

It should be noted that terminating illumination of the sign face is the preferred method of darkening either the exit verbiage or the directional arrows. However, darkening the sign face also can be achieved through mechanically blocking the illumination.

Figure 3G:
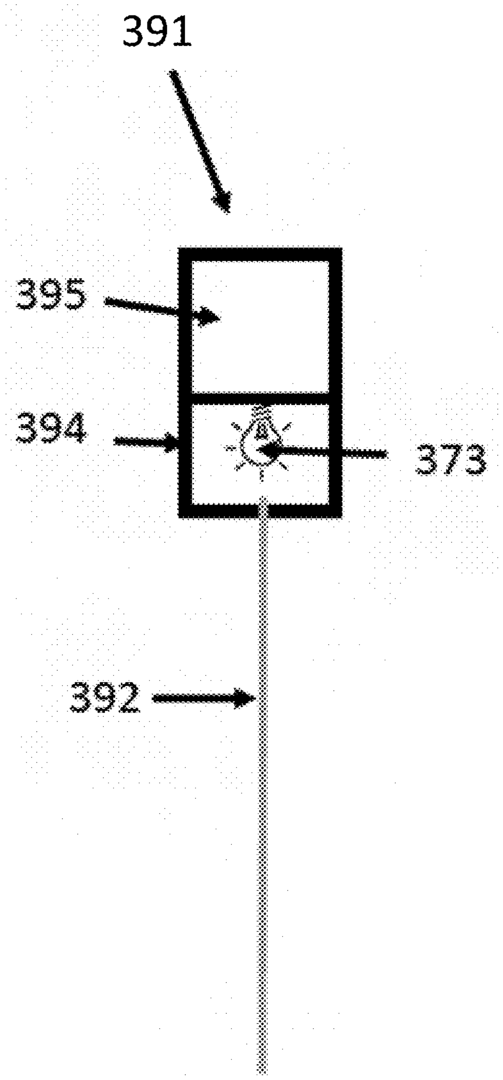
FIG. 3G is a side view of a single-faced version of the alternate embodiment with the lighting section shown in sectional view along line F-F of FIG. 3D.

Referring now to FIGS. 3D, 3E, 3F, and 3G, these drawings depict a down-lit double-faced smart exit sign 390 (FIG. 3F) or down-lit single-faced smart exit sign 391 (FIG. 3G). Lights 373 are isolated into center and end sections using light barriers 402, as in the previously described embodiment, enabling independent control of the color, flashing functions or darkening of the exit indicator 392 and/or directional arrow indicators 56 either on a single-faced sign or a double-faced sign. Lights 373 are focused on the edge of the clear polymer 392 and 403 transferring illumination on to the sign face 392. To facilitate the separation of light from the exit indicator 392 and directional arrow indicators 56 the clear polymer 392 making up the face of the sign will be in three separate panels 399, 400, and 401 unlike conventional edge lit signage which is a one-piece unit. In certain embodiments, the exit indicator 392 will be located on middle panel 400, corresponding to the center section, and the directional arrow indicators 56 will be located on the remaining two panels 399, 401, corresponding to the end sections. The three panels 399, 400, 401 may be adjacent or separated by a small gap. The lighting section 394 is adjacent to the knockout section 395, which has one or more knockouts 393 for additional input devices or output devices. The master controller 12 in an emergency evacuation mode will activate the strobes 397, 398 providing evacuation information. In some embodiments, the strobes may flash red, green, yellow, or other colors. Smart exit sign 390 also incorporates an interface attachment mechanism (preferably internal to the signage housing) for enabling electronic communication between the sign 390 (and various lights 373, input device and output devices incorporated therein) and the master controller 12 or the Wi-Fi system. The smart exit signage 390 performs like conventional static exit signage until the interface attachment mechanism, such as a bus, is in communication with the security system 10.

Figure 3H:
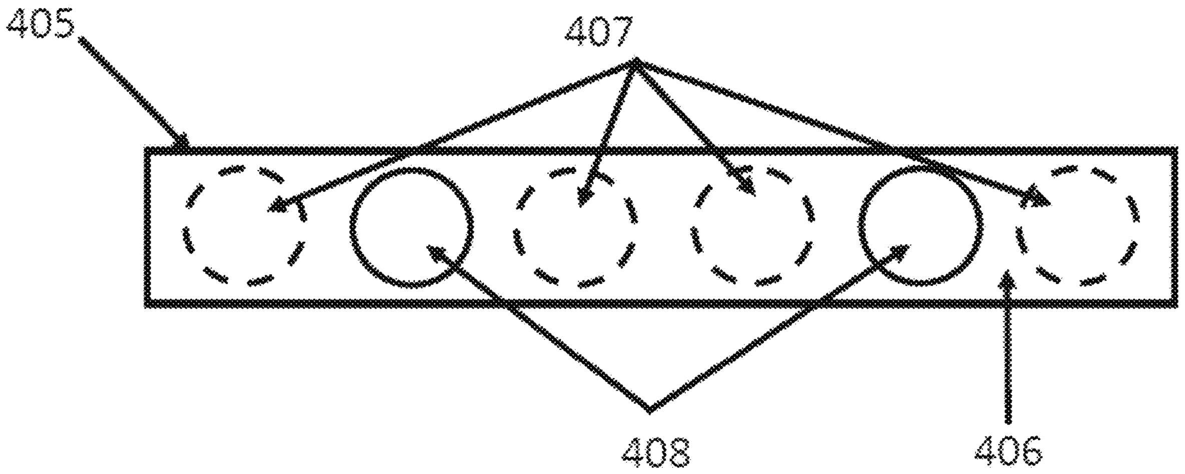
FIG. 3H is a front view of an embodiment of a supplemental emergency exit sign.
Figure 3I:
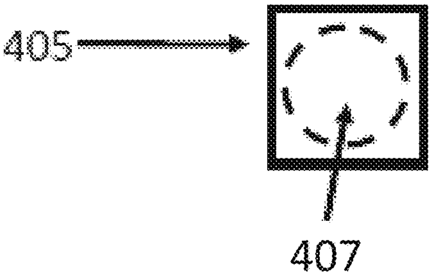
FIG. 3I is an end of the supplemental emergency exit sign of FIG. 3H.

In some embodiments, existing static emergency exit signage may be retrofitted instead of replaced. Referring now to FIGS. 3H and 3I, an embodiment of a supplemental smart emergency sign 405 includes an elongated rectangular housing 406 with four sides and two opposing ends, sized adequate to contain at least one of an input device and output device, with one or more knockouts 407 on any side or end. In certain embodiments, the output devices include one or more strobe lights 408. In preferred embodiments, the supplemental smart emergency sign 405 includes a plurality of strobe lights 408 of different colors or strobe lights 408 capable of changing colors. The supplemental smart emergency sign 405 may be a standalone device utilized in hallways or rooms or attached to or near a traditional static exit sign to retrofit the traditional sign to participate in the security system 10. The supplemental sign 409 may further include any other input devices or output devices as described in connection with other signage, e.g., cameras, sound detectors, sound emitters, motion detectors, etc. The supplemental sign 405 also incorporates an interface attachment mechanism, preferably internal to the housing 406, for enabling electronic communication between the supplemental sign 405 and the master controller 12 or the Wi-Fi system. The master controller 12 may activate or deactivate strobe lights 408 and any input devices or output. The strobe lights 408 preferably have the ability to display different colors based on the pre-programmed mastered controller 12 provided evacuation information.

In some embodiments, the supplemental smart emergency sign 405 is configured to attach to an existing emergency exit sign via an attachment feature. The attachment feature may be an adhesive, mechanical fastener such as a screw or nail, a clip or tie, a shaping of the housing 406 designed to mechanically engage the housing of a standard emergency exit sign via snap fit or other attachment mechanism, or other means for attachment as generally known in the art.

Figure 3J:
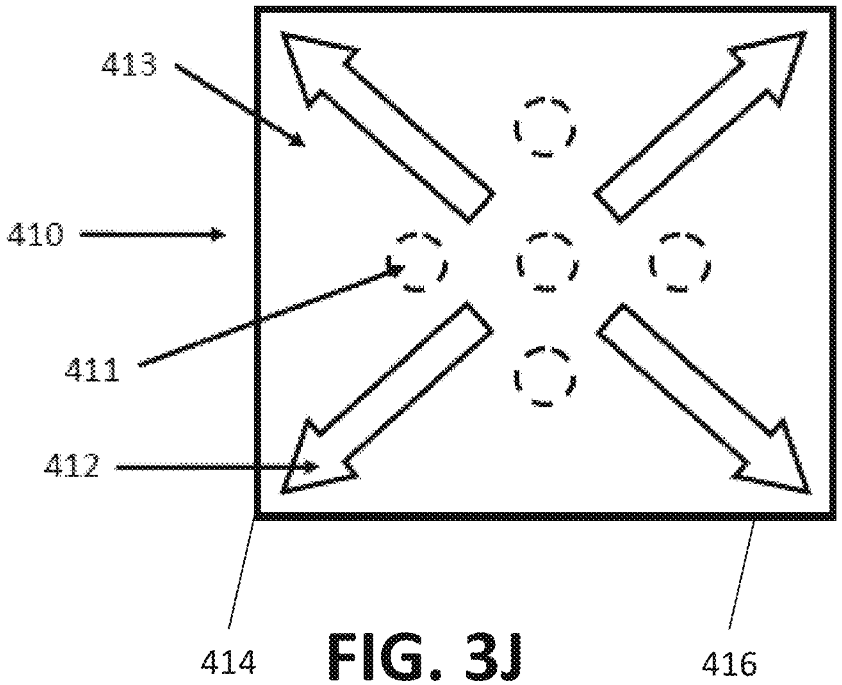
FIG. 3J is a bottom view of an embodiment of a hallway intersection sign.
Figure 3K:
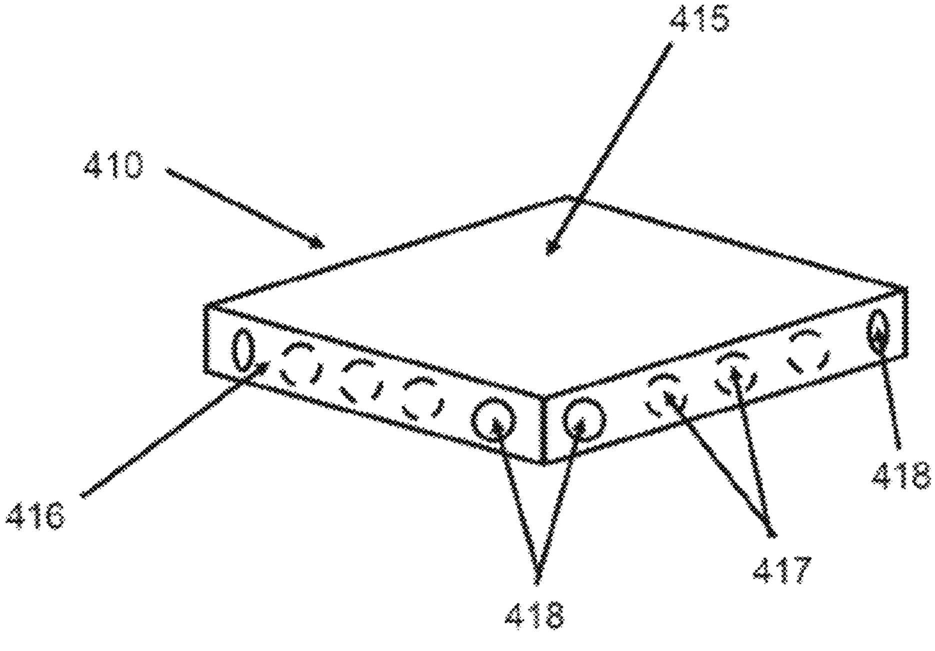
FIG. 3K is a side perspective view of the hallway intersection sign of FIG. 3J.

In some embodiments, the security system 10 may include emergency evacuation signage for use at the intersections of hallways. Referring now to FIGS. 3J and 3K, a hallway intersection emergency evacuation smart sign 410 includes a rectangular or square housing having four sides 416, a top 415, and a bottom 413. The sign 410 is adequately sized to at contain at least one of input devices, output devices and strobe lights. In some embodiments, the top 415 is configured to be attached to a ceiling or suspended from the ceiling (attachment mechanisms not shown). The sign 410 is preferably mounted such that corners 414 of the sign 410 are pointed down each hallway (assuming an intersection of two hallways arranged perpendicularly), with at least one strobe light 418 preferably two on the side of the sign directing light down the hallway. The sign sides 416 and bottom 413 have at least one knockout 417, 411 for input devices and output devices. In some embodiments, the strobe lights 418 are recessed so as to limit viewing of light from the side. During an emergency the master controller 12 can activate directional arrows 412 on the sign bottom 413 and strobe light(s) 418 on the appropriate sides 416 to facilitate safe evacuation. For example, in the event of a threat detected down one hallway, the master controller may activate directional arrows 412 corresponding to the three hallways where no threat has been detected and leave the directional arrow 412 pointing toward the threat deactivated. The master controller 12 may also activate strobe lights 418 colored green adjacent to the corner 414 pointing in the direction of the threat, instructing occupants to move toward the intersection and away from the threat. The master controller 12 may correspondingly activate strobe lights 418 colored red adjacent to the remaining three corners 414, instructing occupants to move away from the intersection that leads to the threat. Hallway intersection smart exit sign 410 incorporates an interface attachment mechanism (preferably internal to the signage housing) for connecting of input interface which enables input devices or output devices to be plugged into and allows the master controller 12 or the Wi-Fi system to be plugged in to. The exit signage 410 is typically not illuminated during non-emergency periods, however the input devices, camera and microphone can be operated independently in non-emergency conditions.

The hallway intersection sign 410 mounts with the sign corners pointing down the hallway with at least one strobe 418 preferably two on the side of the sign directing light down the hallway. The sign sides 416 have at least one knockout 417 for sensor inputs and output devices. The strobe lights 418 are recessed so as to limit viewing of light from the side. During an emergency the master controller 12 can activate directional arrows 412 on the sign bottom 413 and strobe light(s) 418 on the sign side 416 to facilitate safe evacuation. The speaker can be used for announcements and/or for alerting students of potential or real threats.

Hallway intersection sign 410 also incorporates an interface attachment mechanism (preferably internal to the signage housing) for connecting of input interface which enables input devices or output devices to be plugged into and allows the master controller 12 or the Wi-Fi system to be plugged in to. The exit signage 410 is typically not illuminated during non-emergency periods, however the input devices, camera and microphone can be operated independently in non-emergency conditions.

The hallway intersection sign 410, may include internal components for performing power conversion and network communication. For example, the components inside the housing 416 of the hallway sign 410 may include a power converter, a circuit board, wired communication port, wireless communication port, hardwired power for receiving 110 volts, a battery back-up supply, etc.

While the hallway intersection sign 410 is described as being rectangular or square in shape, it should be understood that other shapes are contemplated. For example, a hallway intersection sign designed for use in a T-intersection, where one hallway terminates at a position along the length of another hallway, a triangular-shaped intersection sign having three sides may be used. In other embodiments, a hallway intersection sign may be disc-shaped, having only a single side, and may include strobe lights spaced about the circumference of the sign. Furthermore, the disclosed hallways intersection sign, need not necessarily be located at the intersections of hallways, but could also be positioned in large open rooms with multiple exits or other locations where their use would be logical.

Figure 3L:
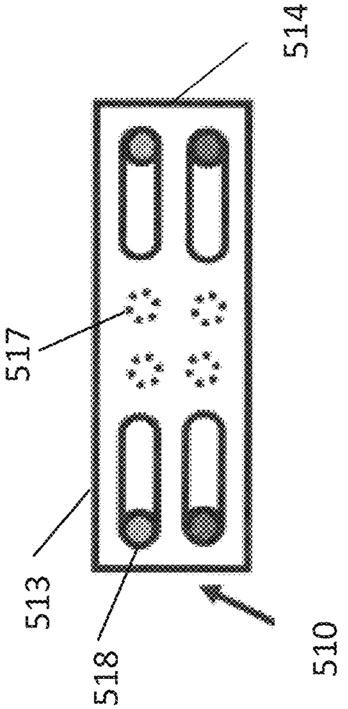
FIG. 3L is a top sectional view of long hallway signage.

In some embodiments, the security system 10 may include emergency evacuation signage for use in non-intersection locations in hallways. Referring now to FIG. 3L, hallway sign 510 includes a rectangular housing having two opposing sides 513 and two opposing ends 514. Included in each end 514 is at least one, and in the depicted embodiment, two, lights 518. The lights 518 may be strobe lights, LEDs or other lighting systems as known in the art. In some embodiments, the lights 518 are capable of illumination in different colors. In other embodiments, each end 514 may include a plurality of lights 518 including at least one light of a first color (e.g., green) and one light of a second color (e.g., red). In some embodiments, hallway sign 510 includes at least one knockout 517 for incorporating additional input devices or output devices into the sign 510. Hallway sign 510 incorporates an interface attachment mechanism (preferably internal to the signage housing) for connecting of input interface which enables input devices or output devices to be plugged into and allows the master controller 12 or the Wi-Fi system to be plugged in to. The hallway sign 510 would typically be mounted on the ceiling or suspended from the ceiling in a hallway, with each end 514 oriented along the length of the hallway. In use, upon detection of a threat, the master controller 12 may activate lights 518 colored green on the end 514 closest to the threat, such that occupants located between the sign and the threat would view the green lights 518 would move toward the hallway sign 510 and away from the threat. The master controller 12 may activate lights 518 colored red on the end 514 furthest from the threat, such that occupants at a location with the hallway sign 510 between them and the threat would move away from the sign 510 and away from the threat.

According to some embodiments, the signs shown in FIGS. 3A-3L may include input devices 14 and/or output devices 16 as described above. For example, input devices 14 may include sound detectors, such as microphones, cameras, two-way communication devices such as wireless communication devices, motion detectors, temperature detectors, anemometers, various types of gunshot detectors, and similar devices. Output devices may include sound emitters, such as speakers or sirens, additional lights, two-way communication devices such as wireless communication devices, and other means for visual and auditory stimulation as known in the art. Embodiments of various room signs, hallway signs, etc. are described below with respect to FIGS. 11 and 12.

Figure 4:
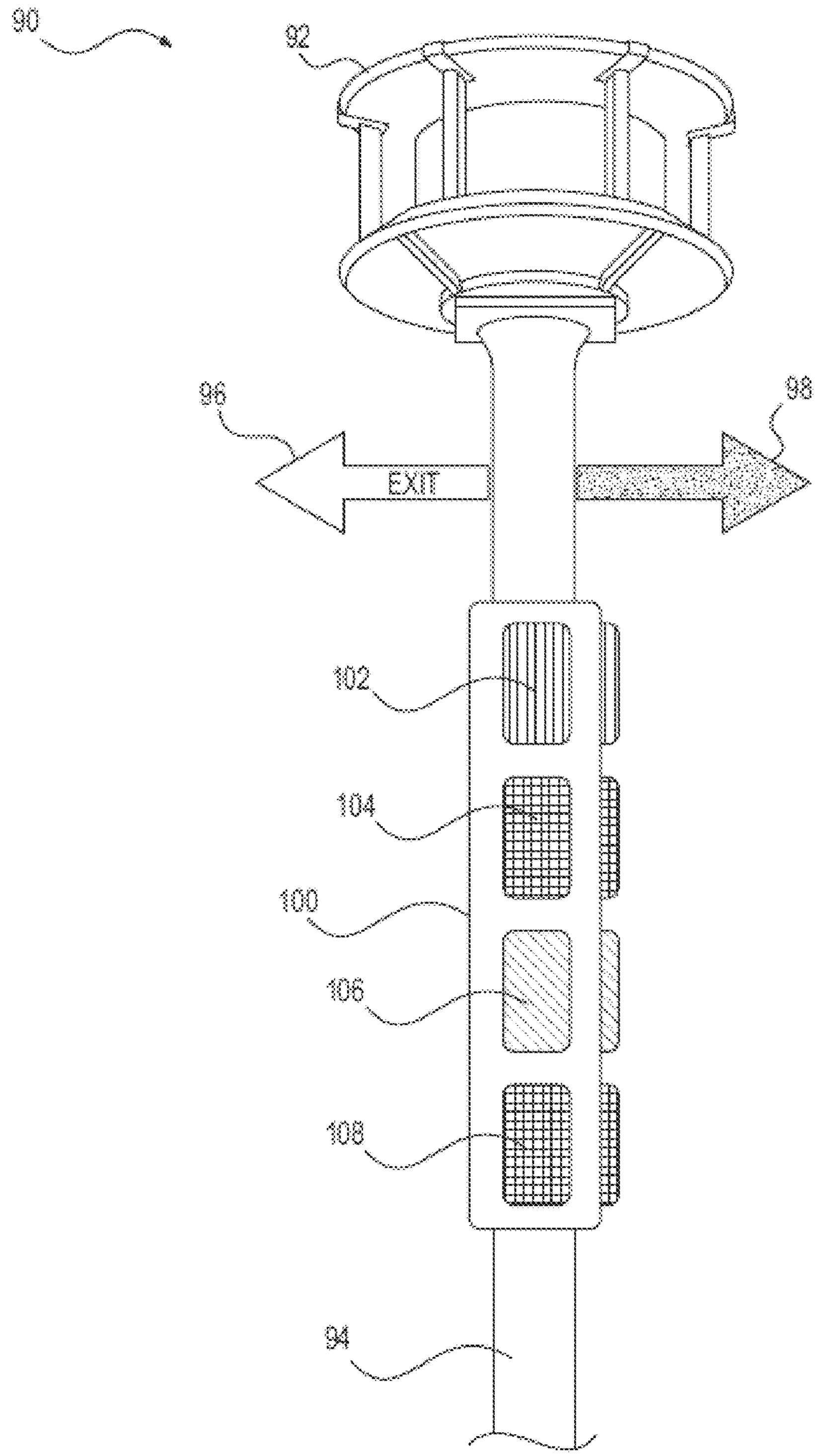
FIG. 4 is a diagram illustrating a beacon that may be incorporated in the security system of FIG. 1 for large open venues or outside events.

FIG. 4 is an embodiment of a beacon 90 according to one embodiment. The beacon 90 may represent another example of an output device 16 of the security system 10 of FIG. 1. Also, the beacon 90 may include input devices 14 as well, such as cameras or microphones. The beacon 90 may be installed in the interior of a building or exterior to the building.

In the illustrated embodiment, the beacon 90 may include a head 92, which may be configured to include a number of input devices 14 and/or output devices 16. For example, the head 92 may include wireless communication transmitting devices for providing wireless signals using a Wi-Fi or cellular protocol to act as the wireless communication transmitter/receiver 24 shown in FIG. 1 or to communicate with the wireless communication transmitter/receiver 24 to provide a wider target area.

The head 92 may also include one or more cameras, one or more speakers, one or more microphones, etc. The head 92 may be positioned at a height to enable the capture of images and to communicate sound to a large number of occupants. For example, the head 92 may be mounted on top of a pole 94 or other structure. In some embodiments, the pole 94 may be installed directly on the floor, on a wall, on the roof of the building, or may be supported by a base platform.

The beacon 90 may also include directional arrows 96, 98 to instruct occupants to move in a desired direction. As shown in FIG. 4, a left directional arrow 96 is illuminated to instruct the occupants to move in that direction. The beacon 90 may also include a status indicator 100 or threat level indicator, which may contain a number of indicator lights for indicating a number of different status conditions. For example, red lights 102 may be used for indicating a serious threat. Yellow lights 104 may be used for indicating a possible threat. Green lights 106 may be used for indicating no threat. Additional lights 108 may be used for flashing signals to call attention to the beacon 90. Some lights may be reserved for communicating certain pertinent information or instructions for specific groups of people. For example, some lights or lighting patterns may communicate that the situation is "safe for medical help to enter." The color and pulse timing/frequency of the lights of the status indicator 100, as well as sounds, may be used to communicate information to first responders. General light coloring, lighting patterns, and sounds can be used to communicate threat levels to students or the general population.

The beacon 90 may include two-way communication devices for enabling people in the vicinity of the beacon 90 to communicate with security personnel or police, as needed.

The beacons 90 may be installed in high gathering areas, such as cafeterias, gymnasiums, hallways, etc. Beacons may also be installed in parking lots, open areas, ball fields, and other gathering areas.

The signs shown in FIGS. 3A-3L and the beacon 90 shown in FIG. 4 provide output indications for instructing people in a stressful threat situation to respond in an easy-to-understand, appropriate manner. Thus, human error can be reduced, whereby indications are appropriately pre-programmed so that the master controller 12 can provide instructions electronically and immediately in response to a detected threat.

The security system 10 and its various components may receive continuous electrical power for operating the electronic equipment. In some embodiments, the components of the security system 10 may include battery back-up power sources in the event that power is lost in the building. The battery back-up may include rechargeable batteries.

When the security system 10 identifies a threat, the security system 10 can identify in real time where the threat is centered and any movement of the threat. Updates to the location of the threats and the movement of the threats can be detected by tracking the movement of a tracking device or material that is applied to the source of the threat or by monitoring noises (e.g., gunshots, screams, etc.) over time. Information can be updated in real time to provide current exit strategies.

In some embodiments, students, teachers, or others may provide input related to the location and status of the threat. The security system 10 receives the input and can update the status information in real time based on the human input. The means of input into the system may be accomplished by a connected input switch or device. It may be accomplished via smart phone, computer, or another networked device.

Figure 5:
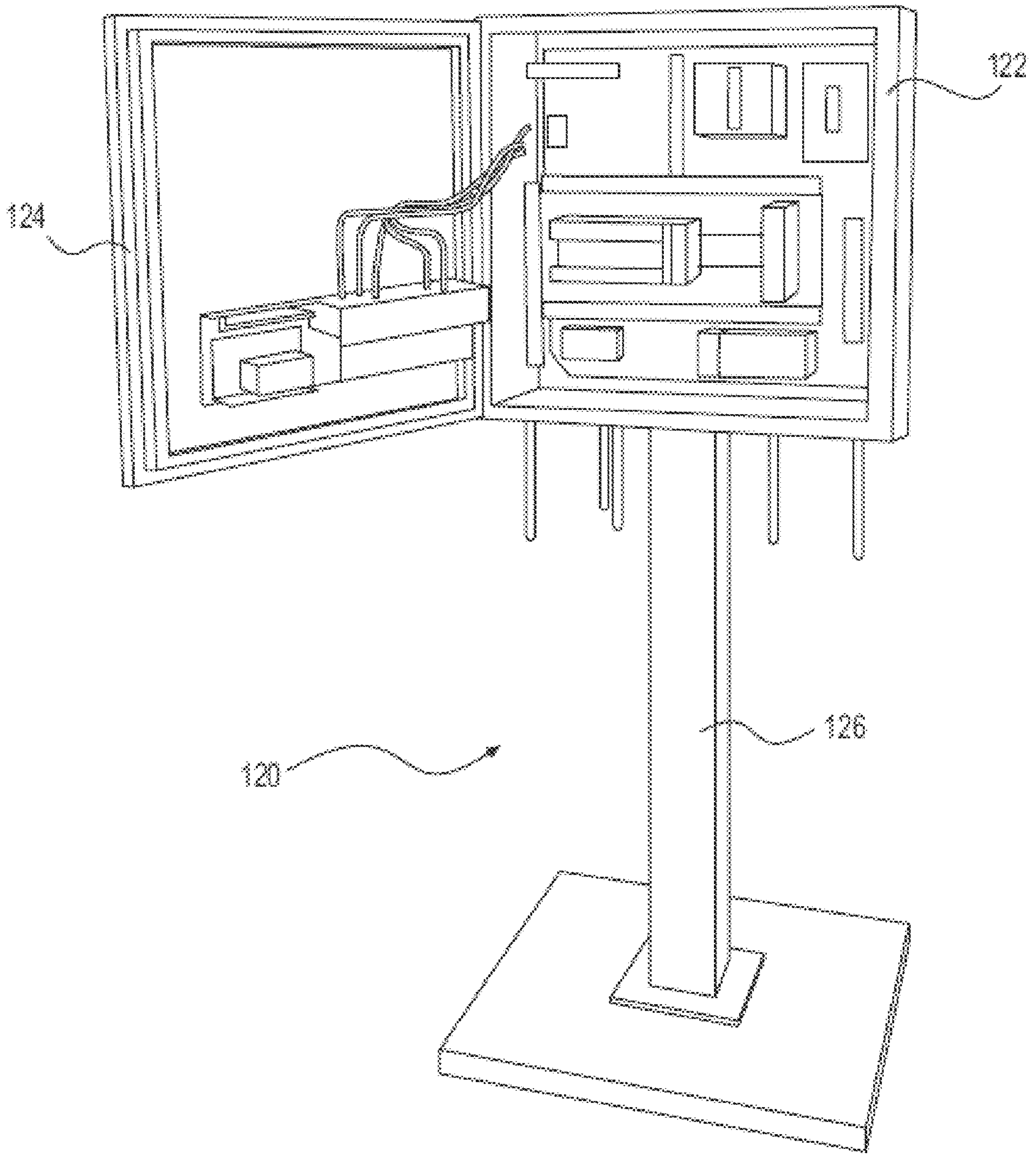
FIG. 5 is a diagram illustrating an example of a programmable master controller shown in FIG. 1.

FIG. 5 is an embodiment of a security apparatus 120, which may include the master controller 12 and other components of the security system 10. In some embodiments, the security apparatus 120 may include physical storage for storing items that can be used in the event of a threat. In this embodiment, the security apparatus 120 includes a compartment 122 and a door 124. The compartment 122 may be configured to store a number of emergency items that may be accessed when a threat is detected. The security apparatus 120 may include an electronic receiver for receiving an electrical signal from a controller, such as the master controller 12, that unlocks the security apparatus 120 and allows an authorized person to open the door 124 to access the master controller 12 and the items stored in the compartment 122. In some embodiments, the security apparatus 120 may be supported on a stand 126. According to alternative embodiments, the security apparatus 120 or other similar storage system may be configured as one or more of the response access kits 20 shown in FIG. 1. In some instances, the security apparatus 120 may not contain the master controller 12, but may simply contain the physical emergency response items, such as lethal and non-lethal weapons, trauma gear, and communication equipment.

The compartment 122 may be configured to store a non-lethal weapon (not shown). The non-lethal weapon may be used to deter a threat. According to some embodiments, a single non-lethal weapon may be configured to include several mechanisms that can perform multiple functions. For example, one device may be configured with a flash strobe, a Taser, pepper spray, etc., which can immobilize a perpetrator without causing permanent damage. The various mechanisms may be built into one device to allow the user to choose the level or type of non-lethal control that may be needed in the event of an emergency situation. The non-lethal weapon may also include an RFID reader and/or a fingerprint recognition sensor or other biological recognition sensor for enabling only authorized personnel to use the weapon.

In some embodiments, the non-lethal weapon may further include a mechanism for projecting a trackable device or material at the perpetrator. In this case, the device or material that is attached to, sprayed onto, or otherwise applied to the perpetrator or clothes of the perpetrator can be tracked by tracking sensors or other input device 14 that can detect the movement of the perpetrator. Tracking and markers that are shot at or placed on the assailant may include a color (e.g., red) to indicate danger. This color can be different from another color (e.g., green) that represents safe objects or people. In some embodiments, a coloring scheme can be used by teachers, staff, first responders, etc., to represent a safe person, wherein the safe people may wear vests or other items having the safe color (e.g., green).

The non-lethal weapon may be associated with a notification that indicates if any one of the functional components of the non-lethal weapon has been deployed. The security system 10 can provide the information or notification of weapon deployment to faculty or to the police.

The non-lethal weapon itself may also include a tracker that can be tracked throughout the building. In this way, the security system 10 can determine where the non-lethal weapons are located during a threat. For example, the security system 10 may detect that one or more non-lethal weapons are headed in a safe zone where students may be gathered, while other non-lethal weapon may be detected as heading toward the threat.

Figure 6:
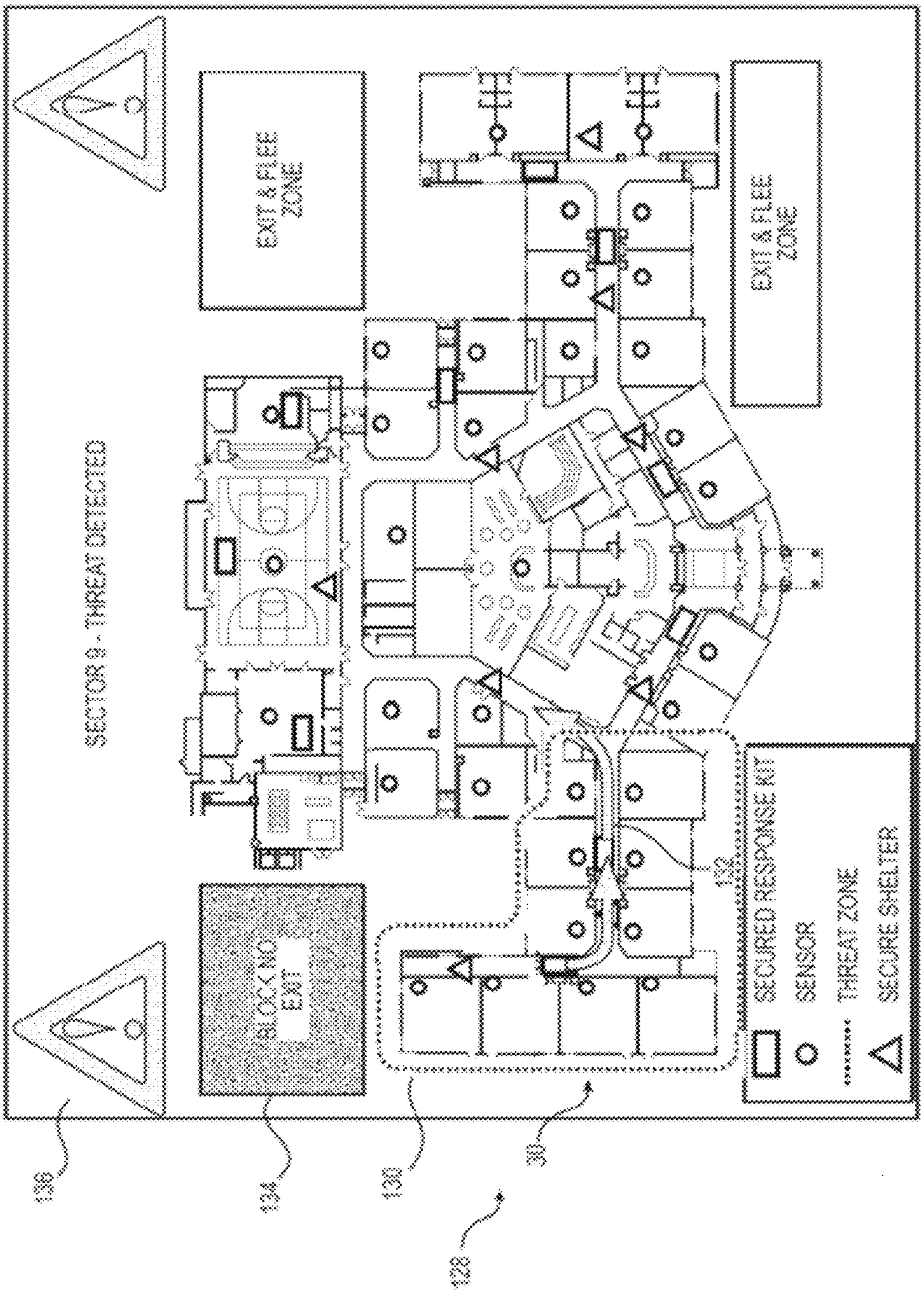
FIG. 6 is a diagram illustrating a graphical user interface (GUI) or other display that may be provided to a number of users showing a map of a building during a security threat, according to some embodiments.

FIG. 6 illustrates a graphical user interface (GUI) 128 or other display that may be provided to a number of users. For example, the GUI 128 may be displayed on portable electronic devices of students or other occupants in order to be informed of a potential threat.

The floor plan 30 of the exemplary building of FIG. 2 when a threat or potential threat is detected may also be shown in the GUI 128 of FIG. 6. When a threat is detected, a "threat zone" 130 may be shown using dotted or dashed line segments. The threat zone 130 may be shown with other distinctive details, such as being shown in red, shown with blinking lines around the zone, etc. The GUI 128 may also include a threat movement 132 indication, such as an arrow, that shows the direction that the threat is moving. Based on threat location information and corresponding time information, the direction 132 can be determined. The threat zone 130 shows the starting location of the initial threat. In some threat situations, there may come a point where the danger or threat area becomes too difficult to track with any reasonable degree of certainty. Thus, instead of indicating the threat movement 132 with an arrow, the threat zone 130 may be expanded and identified as a larger threat area by the outlined area and danger color (e.g., red). People who are in the threat zone 130 may be able to see the assailant first hand and should attempt to go to any available safe area (e.g., green exit or flee zone). Tracking the threat may be most beneficial to those who are not seeing the assailant first hand such that if they determine from the GUI 128 that they are in the imminent path of the threat, they should attempt to move as quickly as possible out of the way and go to a safe zone. Again, the coloring scheme can be used on the GUI 128 to show danger (e.g., red) and safety (e.g., green), which may be the same coloring scheme used with maps, signs, items in the response access kits, etc.

Also, the GUI 128 may include exit information. For example, in the situation where a threat is detected in a particular part of the building (e.g., sector 9), an exterior exit may be blocked (e.g., FIG. 6, 134) because the threat may be closest to that exit. Or, the exit may be locked to prevent a perpetrator from entering through that exit. In any case, the GUI 128 shows that the exit is "Blocked, no exit." Other exterior exits may be available and may be labeled as "Exit and Flee Zone". The GUI 128 may also include a banner 136 at a top that warns the user of the threat. In this example, the banner 136 may include warning symbols (e.g., exclamation points in red triangles) and information of the threat (e.g., "Sector 9—Threat Detected") to warn the user of the location of the threat.

Figure 7:
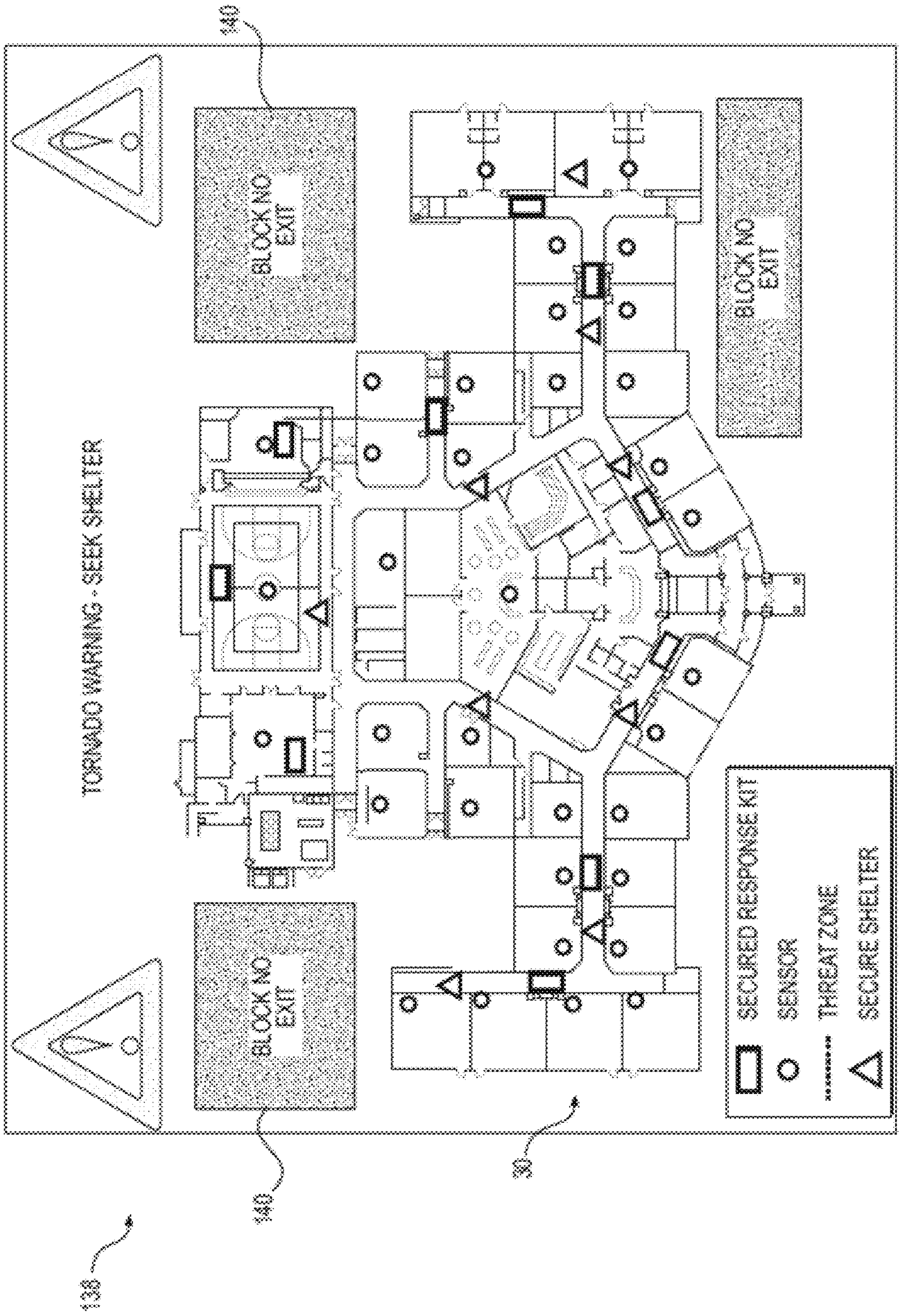
FIG. 7 is a diagram illustrating a GUI that may be presented to one or more users during a tornado warning or tornado watch, according to some embodiments.

FIG. 7 illustrates a GUI 138 that may be presented to one or more users during a tornado warning or tornado watch. The floor plan 30 of the exemplary building of FIG. 2 can be presented in the GUI 138 when this different kind of threat or potential threat is detected. In the event of a tornado, the blocks 140 indicate that the exits are blocked. In this situation, occupants are not permitted to exit the building or are instructed not to exit the building. According to some embodiments, the master controller 12 may automatically lock the doors in a manner that prevents occupants from leaving the building, which might put the inhabitants in harm's way, but at the same time may allow people outside the building to enter the building to find shelter indoors, as is normally preferred during a tornado.

Figure 8:
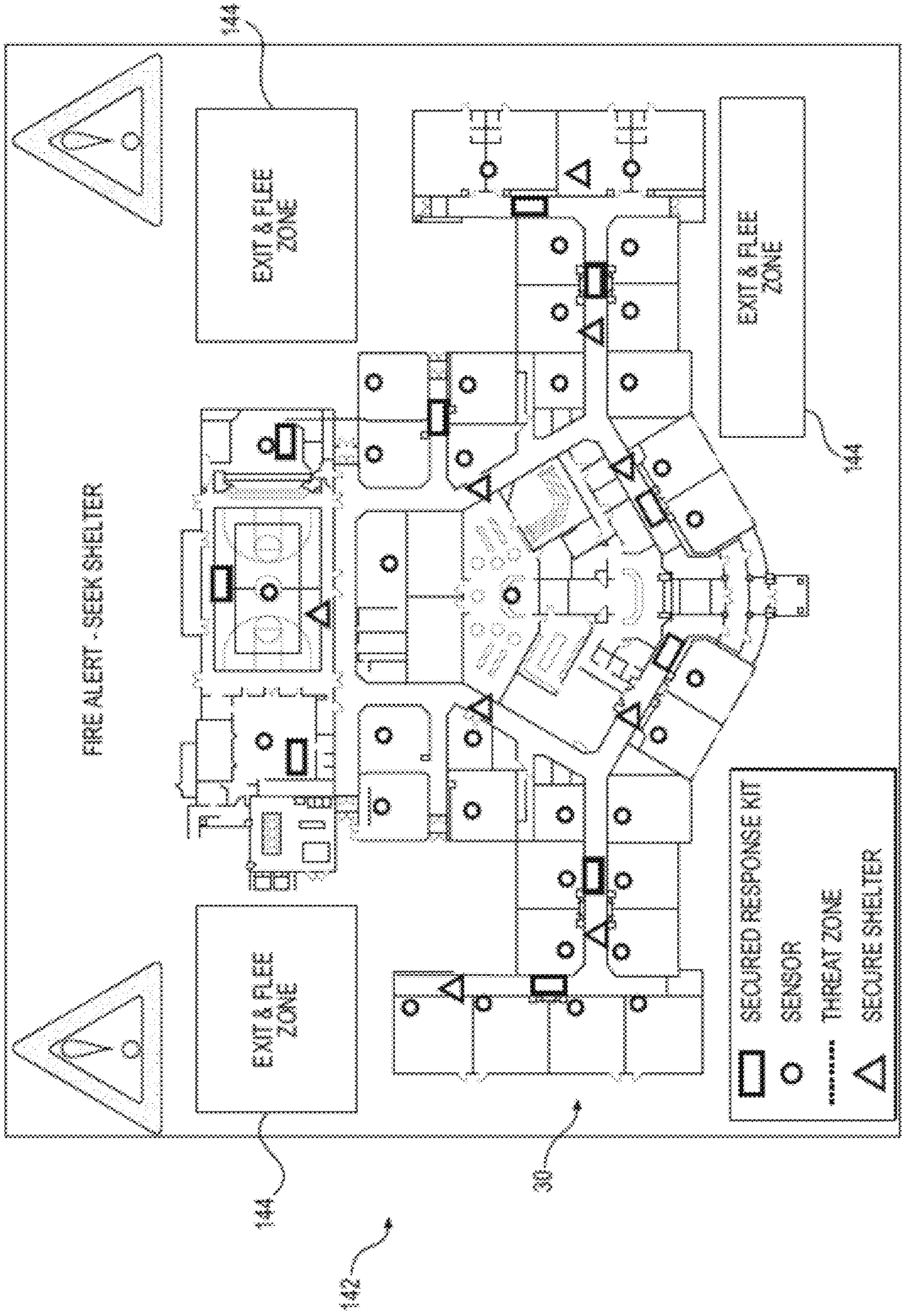
FIG. 8 is a diagram illustrating a GUI that may be presented to one or more users when a fire is detected in the building, according to some embodiments.

FIG. 8 illustrates a GUI 142 that may be presented to one or more users when a fire is detected in the building. The floor plan 30 of the exemplary building of FIG. 2 can be presented in the GUI 142 when this other kind of threat is detected. In the event of a fire, the blocks 144 are used to indicate that the exterior exits should be used and that occupants should exit the building and go to the Exit and Flee Zones 144.

The display of the threats, as shown in FIGS. 6-8, may include information displayed on top of the floor plan that is shown in the background. Threat areas may be shown in red and may include flashing red lines around the zone. The maps may also show the safe zones, which may also flash.

Other passive elements that can be used to supplement the security system 10 may include the response access kit 20 shown in FIG. 1 or the security apparatus 120 of FIG. 5. When a threat is detected, the security system 10 may be configured to allow access to the response access kit 20 or security apparatus 120 by one or more authorized people. From the response access kit 20 or security apparatus 120, trained personnel can use the items in the kit or compartment to restrain, disarm, or incapacitate a perpetrator.

Secure shelters, such as those indicated on the maps in FIGS. 6-8, may also provide supplements to the security system 10. In some embodiments, the secure shelter may simply be a back area of a room that is out of sight from a window. Thus, if a perpetrator in a hallway looks into a window of the door and does not see anyone, the perpetrator may bypass that room.

In other embodiments, the secure shelters may include a structure that allows entry and enclosure. In some cases, the structure may be equipped with two-way communication components to allow those inside the structure to communicate with security personnel. The secure shelters may allow the occupants to lock the doors from the inside and prevent someone from entering from the outside.

In operation, the security system 10 is able to respond quickly to threats with little human intervention. However, the security system 10 may also receive manual input from the occupants of the building to provide additional accuracy to the detection and location of threats. In one example, a security guard may be anywhere in a building when a threat is detected. The present disclosure can help to identify the location of the threat and notify police automatically. The security guard and police can respond more quickly and can proceed to the source of the threat in a quick manner, knowing from the information provided by the security system 10 where the threat is located. Therefore, little time is lost trying to move to an exact location where the security guard or police can engage a perpetrator.

With automatic door locks, the master controller 12 can configure the locks to allow people to open and exit through the doors from the inside of a room or shelter, but prevent someone on the outside from opening the door to enter a room or shelter where innocent people may be located. In some embodiments, security personnel may have special keys or other means for unlocking and/or opening the doors from the outside as needed.

The security system 10 may further include face recognition and operate with a database that contains people who may be banned from entering the monitored building. For example, in a school setting, certain students, such as those who have been expelled or suspended may be banned from entering the school. In another example, a faculty member may be associated with a person who has a restraining order and may not be allowed near the faculty member. In these situations, certain people may be banned from the school. Therefore, the facial recognition may be used to determine if these people are present on the premises and can warn the faculty and/or students that a potential threat exists. Cameras can be set up at or near one or multiple entranceways for detecting facial features for alerting security when someone enters or approaches the building who is not allowed inside.

Figure 9:
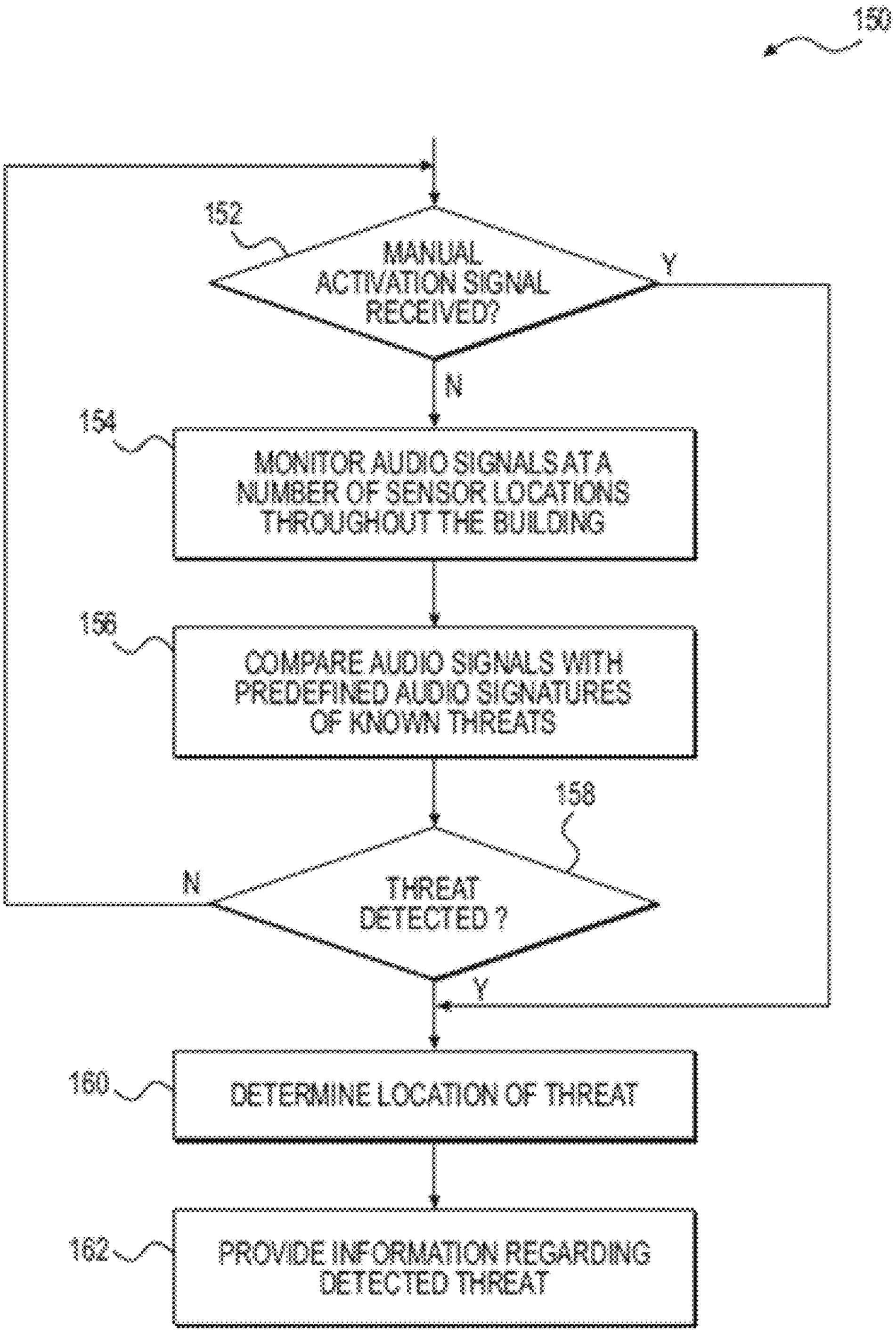
FIG. 9 is a flow diagram illustrating a method for detecting a security threat within a building to be monitored, according to various embodiments.

FIG. 9 is a flow diagram illustrating a method 150 for detecting a threat within a building to be monitored. The method 150 includes a first decision block 152 indicating a step of determining whether a manual activation signal has been received by an authorized individual. If so, the method 150 skips ahead to block 160. Otherwise, if no manual activation signal is received, the method 150 proceeds to block 154.

Block 154 indicates that audio signals are monitored at a number of sensor locations throughout the building. Block 156 indicates that the audio signals are compared with predefined audio signatures of known threats. For example, the audio signatures of known threats may include recognizable frequency characteristics that may indicate specific events, such as a gunshot or a person screaming. In decision block 158, the method 150 determines if a threat has been detected, based on the comparison step performed in block 156 for detecting threats. If a threat is detected, the method 150 proceeds to block 160. Otherwise, if no threat is detected, the method 150 returns back to decision block 152 for monitoring whether a threat is detected, either by a human providing manual activation or by automatic systems comparing audio with known threats.

When a threat is detected and the method 150 proceeds to block 160, the method 150 further includes determining the location of the threat. The location may be detected by the location of the manual activation signal or by the location of audio sensing equipment that senses audio signals indicative of a threat. This information of the location of the threat can be used, as indicated in block 162 to provide information regarding the detected threat. Details of various steps that may be taken as a result of a detected threat are described below with respect to FIG. 10.

Figure 10:
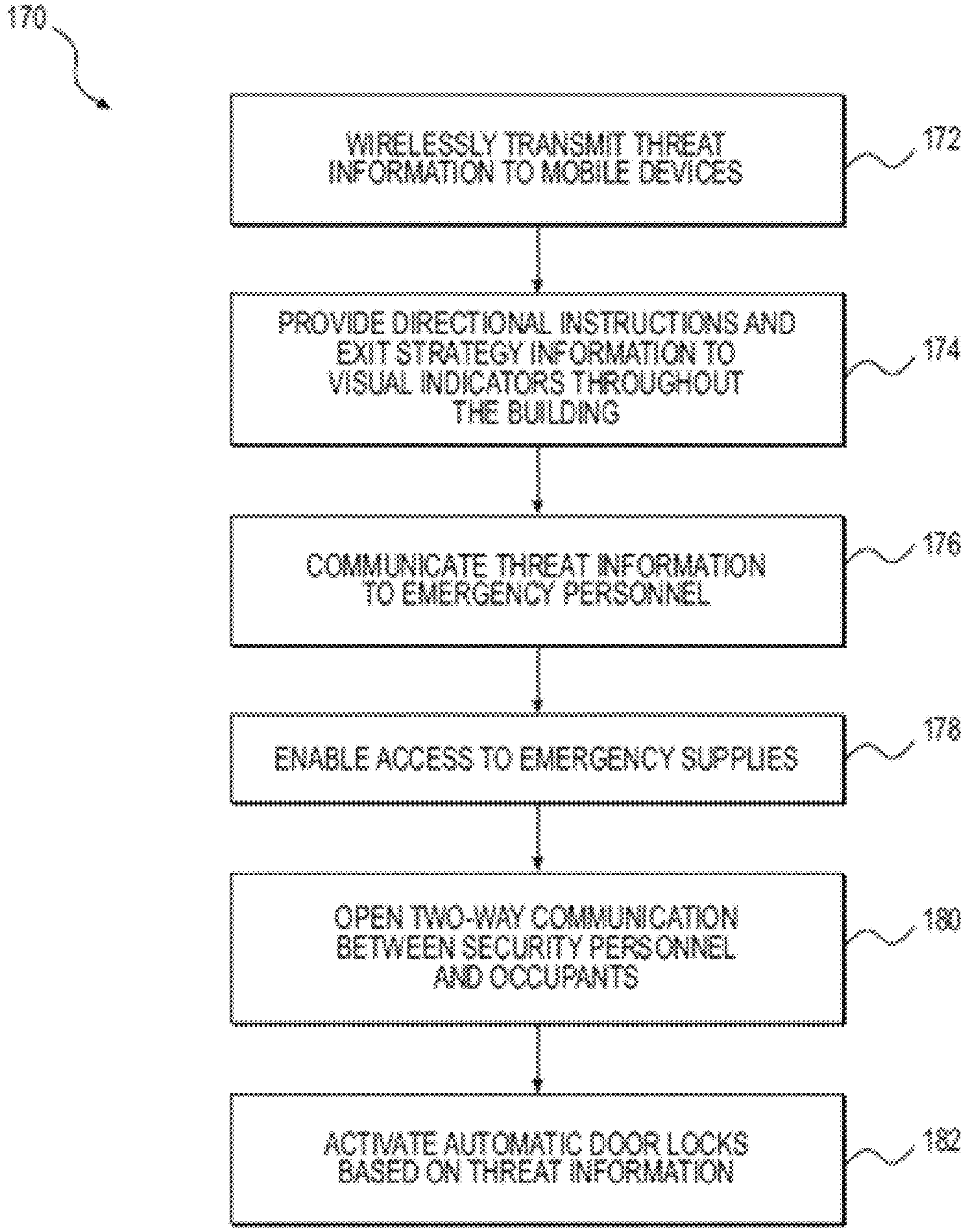
FIG. 10 is a flow diagram illustrating a method of various actions that may be performed in response to detecting the presence of a security threat.

FIG. 10 is a flow diagram illustrating a method 170 that may be performed, including a number of activities that may be performed in response to detecting that a threat is present and the location of the threat. Responses to the detected threats may or may not require human verification. If verification is required, the system may determine that it is received from an authorized user or by a number of non-authorized on-site witnesses or occupants who may report the same threat. In some embodiments, a customized configuration may be defined by the client or manager. As indicated in block 172, the method 170 optionally includes wirelessly transmitting threat information to mobile devices. The threat information may include maps and/or floor plans for showing the location of a threat, such as the information shown in FIGS. 6-8. In other embodiments, the method 170 may begin with step 174, providing directional instructions and exit strategy information to visual indicators located throughout the building being monitored, for example, the smart signs discussed above. The directional instructions and exit strategy information can be used by the occupants of the building to proceed in a manner that will separate them from danger. In block 176, the method 170 includes communicating threat information to emergency personnel. For example, details of the detected threat can be provided to security personnel located either on-site or off-site. Also, details can be provided to police, paramedics, fire departments, or other off-site personnel, via text message, electronic communication between the master controller 12 and the off-site personnel's computer systems, displaying maps on a GUI, or other means.

Method 170 further includes step 178 of enabling access to emergency supplies. The emergency supplies may be used to disarm any perpetrator, track the perpetrator, or provide any type of protection of the occupants from the perpetrator, including the use of lethal or non-lethal supplies and trauma emergency medical supplies. The method 170 also includes step 180 of opening two-way communication channels between security personnel and occupants. For example, security shelters (e.g., where occupants may hide) may be equipped with communication equipment for communicating with security personnel. In other examples, directional signs and other instructional components for informing occupants of the threat and how to avoid the threat may be also configured with two-way communication devices. Method 170 further includes the step 182 of activating automatic door locks based on threat information.

It should be recognized that the steps of FIG. 10 are not necessarily performed in the order shown, but may be performed in any suitable order or simultaneously. In some embodiments, all or most of the steps of FIG. 10 can be performed immediately after a threat or potential threat is detected and the location of the threat is detected. According to some implementations, the steps described in blocks 172, 174, and 182 may be dependent on the location of the detected threat, which may be detected in block 160 shown in FIG. 9.

The security system 10 may include decibel (dB) monitoring, tracking, and alert systems and may include a dedicated controller, high definition video, and audio recording controller functionality to identify, detect, and classify audio sounds such as gun-fire, key words (e.g., gun, knife), distress screams (or other threat-related sound patterns, frequencies, and dB levels) with initial location and tracking of subsequent audio events (e.g., dB level, frequency, time stamp registration comparisons) inside school buildings, public or private buildings, and other outside applications.

The security system 10 includes immediate communication of threat and location identification via phone applications and other emergency communication systems to law enforcement, emergency medical response personnel and school staff, simultaneous emergency notification and exit instructions via phone app to listed subscribers, smart-directional exit signs, indicating exit direction or shelter-in-place according to threat or emergency, visual and/or audible alarms, and control of various environmental factors (lighting, sound, door locks and deterrent barriers). Event activation initiates continuous live streaming and recorded audio and video, sharable to select groups. Video types may include standard, thermal, IR, etc. Still images and a list of descriptive or identifying features of a perpetrator, obtained from various sources, may be used by the system and shared.

As mentioned above, the system 10 allows access to lethal or non-lethal secure weapon kits. The secure response storage units may include lethal or non-lethal weapons, personal security protection, i.e. bullet-proof vest, helmet, and trauma emergency medical supplies. Secure response storage units may be installed with fingerprint identification, RFID access, etc., for weapon access. Secure response storage units may be installed with emergency activation and appropriate notification of deployment to police, school staff, and authorized personnel. Non-lethal weapons systems may be installed with secure authorization features, e.g., fingerprint identification, RFID access, etc. for weapon operation. The non-lethal weapons may be installed with real time tracking systems and discharge indicators synchronized with phone applications to appropriate personnel.

The security system 10 may be in communication with and monitored by a kiosk information center, which may monitor a number of buildings. The security system 10 or kiosk information center may include license plate/car identification database for early detection of prohibited persons and automatic alerts at entry ways of buildings. The kiosk may be an interactive display. The logic, processing of sensor data, communication with external library data (e.g., license plate data, facial recognition data, etc.) can be a function of the master controller 12. The system may include facial recognition of prohibited non-entry persons based on facial recognition database and auto alerts at entry ways, automatic building entry door locks for high risk potential threat tracking. The security system 10 may also be supplemented with metal detectors at entry ways and detention hallway(s) with "auto-lock" capabilities to contain the potential threat pending investigation.

In addition, the security system 10 may include designated and accessible smart-connected secure shelters for those who need it, auto-notification of its activation and locking with interior two-way communications capability to appropriate personnel, and override unlocking capability with designated authorization.

The security system 10 may further be implemented with unmanned autonomous systems 257, which may include, for example, robots, drones, deployable trackers, mobile cameras, and mobile communications systems. Some embodiments of unmanned autonomous systems 257 may include zip lines, cable lines, or other devices for allowing equipment to be moved into dangerous areas for obtaining information about the threat or resolving a threat without placing human life in harm's way. Mobile tethered hybrid drones with untethered capabilities may be used for exterior surveillance and countermeasures against threats. The drones may be used on buses for scheduled bus transport, scheduled coach transport, school transport, private hire, tourism, promotional buses for political campaigns, privately operated buses, band tour vehicles, etc. Rail drones may be used in interior surveillance and countermeasure situations, such as on scheduled bus transport, scheduled coach transport, school transport, private hire, tourism, promotional buses for political campaigns, privately operated buses, band tour vehicles, etc.

According to some embodiments, the security system 10 may be permanently installed within a building. In addition, the security system 10 may be a portable interior/exterior security system for indoor or outdoor venues, calibrated to coverage specific areas and mapped.

In summary, the security system 10 may have a number of highly visible beacons placed in outdoor areas, indoor gathering areas, and hallways. They may be equipped with cameras, microphones, speakers, and highly visible indicators may include call buttons with two-way communication. Each beacon may include connectivity using Wi-Fi, cellular, and/or dedicated hardwiring. The security system 10 may be connected to communication signs for managing crowd directive, such as exit left, exit right, and shelter-in-place. Safe gathering zones may be preplanned, including smart-connected structural shelters where available. Signs may direct evacuees to designated safe zones depending on the location of the threat. An array of microphones may be located throughout buildings and campus facilities to locate threats. This may be done utilizing dB levels, frequency analysis, and time stamps. Microphones, cameras, metal detectors, and human input may be fed into the master controller 12. The master controller 12 may coordinate all inputs and provide simultaneous communications to involved parties, using smart phone, visual signs, lights, and speaker announcements.

The security system 10 may vary, depending on indoor and outdoor usage. It may be portable and may include a series of beacons, sensors, and signs placed in a grid pattern to cover temporary venue events, such as street festivals, outdoor concerts, sporting events, parades, and other similar events. Height, size, and visibility can be scaled to match the particular needs.

Certain countermeasures can be enabled and integrated to work in conjunction with the security system 10. The signage disclosed in FIGS. 3A through 3L may incorporate Wi-Fi hardware as an input device and/or output device which in turn communicates with the system Wi-Fi 244 which enables the building to contain a near-field Wi-Fi network which in communication with the master controller 12, 242 enables autonomous drones the necessary flight precision to immediately respond to threats providing additional information, distracting the perpetrator and/or deploying non-lethal weapons against the perpetrator. Countermeasures may include unmanned autonomous systems, such as autonomous and remote-controlled mechanisms, such as bomb retrieval robots, general robots, drones, mobile cameras, and mobile communication systems. The security system 10 may assist in sensing and communicating real-time situations. The system 10 can also provide reactionary countermeasures such as pepper spray, deployable tracking devices, target markers, smoke screens, Tasers, lighting, sound, announcements, etc.

Use of motion sensors as input devices 14 (FIG. 1) may be configured to obtain time stamp information. The time stamp information may include off-hour times, along with restricted area information, to flag a general security alarm.

The security system 10 may further include off-site monitoring, which may include human involvement. For example, one individual may be able to monitor many school cameras and microphones for picking up noises that might trigger a threat detection. One individual may be able to operate initial response countermeasures for multiple security system at multiple locations (e.g., multiple schools). Countermeasures may include on-site activation of audible alarms, lights, vehicles, etc. or off-site measures, such as communication with associated staff and/or first responders to share intelligence of potential or confirmed threats. Other countermeasures may include the activation of deterrent sounds, such as the sound of gun fire, voices, instructions, simulated sound of a response system approaching, the sound of drones, etc.

The various smart emergency signs 50, 350, 351, 390, 391, 405, 410, 510 may be installed within a room (e.g., classroom) of a building. The sign for the room may, for example, may be installed above a door connecting the room to a hallway or other open area. In some embodiments, supplemental sign 405 may be used as a standalone sign in smaller rooms with only one or limited exits. The supplemental sign 405 lacks backlit verbiage (i.e., the word "exit" and directional arrows), and therefore can provide a smaller platform for input devices, output devices and strobe lights 408, than other smart signs or traditional static signs.

The signs 50, 350, 351, 390, 391, 405, 410, 510 preferably include direct electrical and/or cellular connection, Wi-Fi, Ethernet cable (e.g., CAT 5 cable) and power cable (e.g., 110 VAC cable), or other means for communication and power. The Ethernet cable allows for communication with a variety of communication protocols based on the protocols used throughout the building in which the security system 10 is installed. In some arrangements, each room within a building may include one or more signs 50, 350, 351, 390, 391, 405, 410, 510 in each room or in select rooms.

Signs 50, 350, 351, 390, 391, 405, 410, 510 may also include a microphone, a still and/or video camera, a speaker or other input devices 14 and output devices 16 which can be installed in the sign housing by removing the knockouts 45, 393 and 407. The signs 50, 350, 351, 390, 391, 405, 410, 510 may include one or more strobe lights 53, 54, 397, and 398; one or more (preferably two) high-intensity flashing light or strobe light of a designated color that can be used to draw attention to the room sign during an event and through training can inform the occupants of the proximity of the threat and/or appropriate evacuation routes. The speaker can be used for classroom announcements and/or for alerting students of potential or real threats.

The room or hallway sign 50, 350, 351, 390, 391, 405, 410, 510 may include internal components for performing power conversion and network communication. For example, the components inside the housings of the various signs may include a power converter, a circuit board, wired communication port, wireless communication port, hard-wired power for receiving 110 volts, a battery back-up supply, etc.

All smart signage is preferably connected to the master controller via direct electrical and/or cellular connection (e.g., Ethernet cable), Wi-Fi, etc. and may contain sensory input devices, cameras, microphone, speaker, one or more strobe lights, and one or more knockouts for additional input devices or output devices.

In some embodiments, a security system similar to the embodiments discussed above can be installed in a movie theater. In addition to signs 50, 350, 351, 390, 391, 405, 410, 510, a movie theater may incorporate the video and audio systems of the theater for assisting the occupants to exit the theater when a threat is detected. According to one embodiment, a projector may be designed to include an integrated controller and multiple inputs. The projector can then display emergency information to the occupants on the movie screen. The integrated controller, for instance, can be configured to provide a movie input to the projector during normal operation. However, when a threat is detected, the controller can switch to one of various alarm inputs, based on the detected threat. For example, if a fire is detected, the controller may switch to an alarm mode to assist people to evacuate the theater. If another type of threat is detected, the controller may switch to an evacuation mode to direct people in a direction away from the threat.

The theater security system may provide visual instructions displayed on the screen, as mentioned above. For example, directions (e.g., exit to the right, left, back, front, etc.) can be given to move people away from danger. In addition, the security system may have similar switching control for a sound system of the theater, such that exit instructions or other instructions can be provided audibly to the occupants. Also, the theater security system may further include exit signs and hallway signs in the hallways and lobby of the theater to instruct occupants after they have exited the individual theaters.

In addition to modifying existing theater equipment to provide output signals to the occupants, audio sensors may be installed in the theater security system. For example, the audio sensors may be configured to detect sounds (e.g., gunshots) that are not part of the movie itself. In some embodiments, a processor may be configured to compare the audio output from the movie with ambient sounds within the theater to determine if the ambient sounds are characteristic of a threat condition.

In still other embodiments, security systems may be used in an office environment and incorporated into existing display devices, such as computer monitors. For example, in an office setting, office equipment (e.g., computer monitors, printers, or other electronic equipment) may be used for displaying information to occupants. Switch controls, as mentioned above, may be configured to switch from a normal mode (i.e., office workers using their computer monitors of other devices for regular business activities) to an alarm mode (i.e., the computer monitors or other devices being used to display emergency information). Also, school computers and/or tablets may be configured to allow switching from a normal mode to an emergency mode to provide visual and/or audible information to the user. In this regard, the display information may include directional information if the location and orientation of the computer within a room is known. Otherwise, general information may be provided to the user, such as instructions for the user to observe local evacuation signage.

Generally, sensors (e.g., cameras, video cameras, microphones, smoke detectors, etc.) for detecting a threat may be incorporated into signs, as described with respect to FIGS. 3A through 3K. In other embodiments, the sensors may also be independent sensors that are not incorporated into signs, but may still be able to detect distinct sounds (e.g., gunshot, scream, key word recognition, etc.), smoke, gas, flashes of light (e.g., from a fired gun), and/or other conditions. These independent sensors, in some implementations, may be incorporated into a system such as the one disclosed below with respect to FIG. 11.

Figure 11:
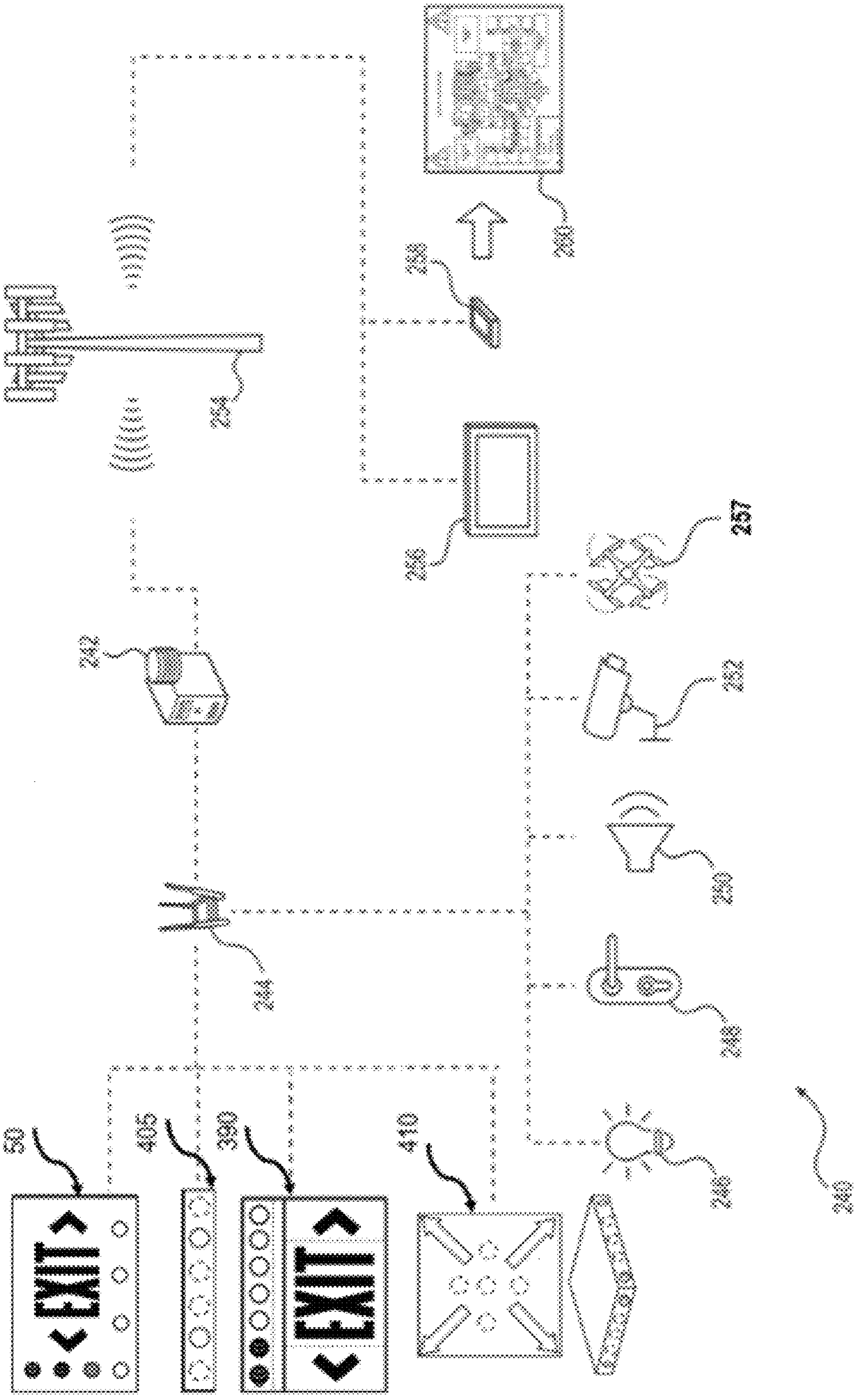
FIG. 11 is a diagram illustrating another security system that may be installed in a building or space to be protected, according to various embodiments.

FIG. 11 is a diagram illustrating an embodiment of a security system 240 that may be installed in schools, college/university buildings, hospitals, shopping malls, government facilities, event centers, stadiums, retail stores, churches, resorts, retirement communities, fitness centers, theaters, hotels, airports, subways, and other buildings or spaces. The security system 240 can also be installed permanently or temporarily in outdoor areas, such as neighborhoods, gated communities, ball fields, theme parks, etc.

The security system 240 includes a master control 242 in communication with a wireless communicator 244, which in turn is in communication with a number of room and hallway exit signs 50, 350, 351, 390, 391, 405, 410, 510. The wireless communicator 244 may also be in communication with a lighting system 246, a door/window locking system 248, a speaker system 250, and a surveillance system 252. The master control 242 is also in communication with a wireless communication tower 254, which in turn communicates wirelessly with a closed-circuit television system 256 and a number of mobile devices 258, such as smart phones, tablets, etc. Information regarding potential or recognized threats can be communicated to and displayed by the monitors or display screens of the closed-circuit television system 256 and/or mobile devices 258. The displayed information may be in the form of a graphical user interface (GUI) 260 or other suitable indication, view, screen, etc. Hardwire communications such as CATS 5 can also be utilized to perform the above operational and communication activities.

The master control 242 may be configured to execute logic processes related to security of the building or other area being monitored. The master control 242 may also contain memory or other data storage and/or may be able to access data from an external database.

The wireless or wired communicator 244 may have routing and location capabilities for communicating location-specific data to the plurality of smart signs 50, 350, 351, 390, 391, 405, 410, 510. For example, the wireless communicator 244 may instruct any of the room signs to display any one of the arrangements depending on the location and orientation of a threat with respect to the room in which the room signs are located. The wireless or wired communicator 244 is also configured to communicate with integrated accessories, such as lights, door locks, speakers, cameras, lock boxes, license plate recognition systems, facial recognition systems, interior and exterior drones, and/or other systems and components of the building or venue.

The closed-circuit system 256 and mobile devices 258 may include networked subscribers or users in proximity to the monitored area. The devices of the closed-circuit system 256 may include closed-circuit televisions, smart phones, tablets, computers, etc. The information sent to these devices may include texts, visual images or graphics, dynamic updates, GPS or fixed location logic for custom alerting, etc. The GUI 260 or other display may include push alerts, texts, visuals, dynamic updates, etc.

In some embodiments, the master control 242 may be configured to receive information about threats from an anonymous source. For example, smart phones, tablets, and/or other electronic devices may comprise specific hardware, software, and/or firmware components for enabling the user to report threats to the master control 242. The reporting capabilities may be used to flag the system 240 for immediate response in the event of an emergency or serious threat.

Additionally, the reporting capabilities may allow the user to call for help or assistance in the event of a lesser type of threat, such as to report the behavior by a bully. This reporting can be made anonymously in some cases. The reporting of bully behavior can be used as an early deterrent to violence. In some cases, smart devices (e.g., smart phones) and/or fobs may be incorporated into the security system 240 to assist in anti-bully measures. With the reporting of threats, emergencies, and/or bully behavior, the system can identify the location and time of each report to be able to pinpoint the place and time where threats of all types are occurring.

Figure 12A:
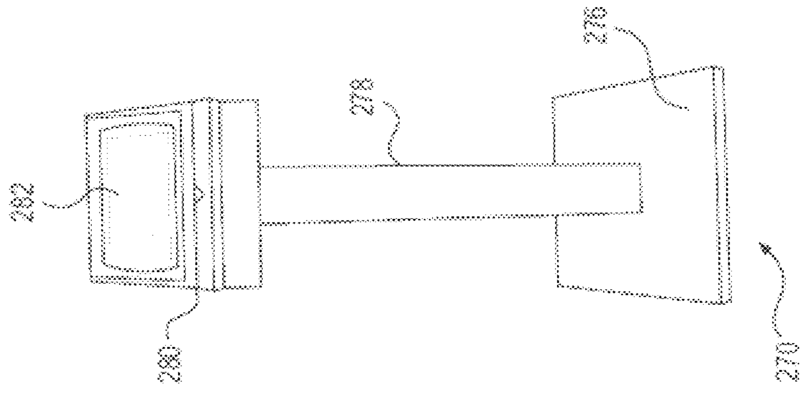
FIG. 12A is a diagram illustrating a controller interface according to one embodiment.
Figure 12B:
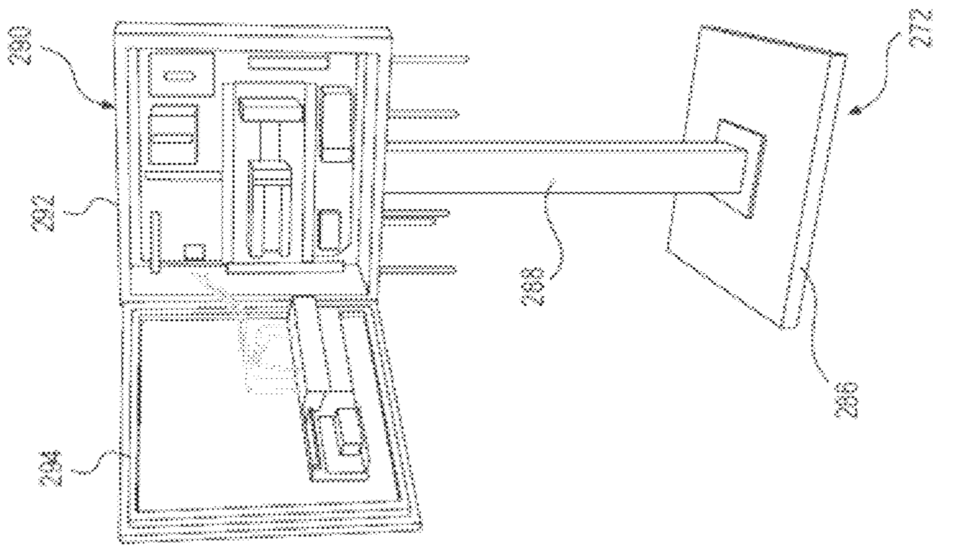
FIG. 12B is a diagram illustrating a programmable master controller according to one embodiment.
Figure 12C:
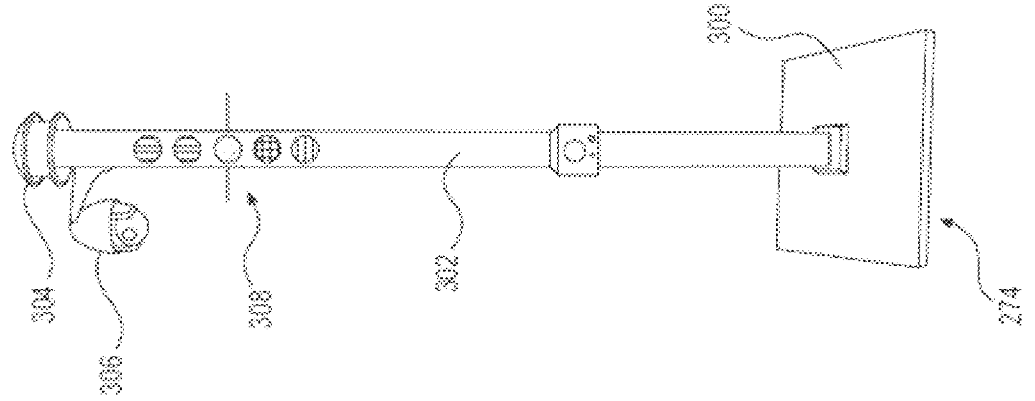
FIG. 12C is a diagram illustrating a beacon according to one embodiment.

FIGS. 12A-12C illustrate embodiments of a controller interface 270 (FIG. 12A), a programmable logic controller 272 (FIG. 142), and a beacon 274 (FIG. 12C). In one embodiment, the controller interface 270 may comprise a pedestal 276, a column 278, and a security module 280. The security module 280 may include a housing, which may be configured to house a controller, such as the master controller 12, memory 15, and external interface 18 shown in FIG. 1. Also, the security module 280 may include a display 282, which may be configured as a user interface for receiving input from the user and providing output to the user. The display 282 may be a touch display, input control device, and/or a multi-layer display and may be configured to display one or more of the exemplary GUIs shown in FIG. 6-8 or other relevant information.

According to one embodiment, the programmable logic controller 272 may include a pedestal 286, a column 288, and a security module 290. The security module 290 may include a housing 292 and a cover 294 that enable access to the interior of the housing 292. The housing 292 may be configured to house a processor, such as the master controller 12, for controlling the logical processes of the programmable logic controller 272. The security module 290 of the programmable logic controller 272 may include computing power, logic, Wi-Fi and cellular capabilities, and physical storage for storing security items, such as vests, whistles, lethal and non-lethal weapons, handcuffs, etc. The programmable logic controller 272 may include many of the same features as discussed above with respect to the security apparatus 120 of FIG. 5.

According to one embodiment, the beacon 274 may include a pedestal 300 and a column 302. In other embodiments, the pedestal 300 of the beacon 274 may be omitted and the column 302 may be attached to any suitable structural support of a building where security is being monitored. In the illustrated embodiments, a head 304 is attached to a top of the column 302 and a strobe light fixture 306 may be connected to an arm that branches off from the column 302. Also, a number of warning lights 308 may be installed on the column 302 similar to the beacon 90 of FIG. 4.

The head 304 may include any number of cameras for obtaining images surrounding the beacon 274. The head 304 may also include one or more microphones for detecting sounds or voices. Also, the head 304 may include one or more speakers for providing sounds, alarms, spoken instructions, etc. to the occupants near the beacon 274. The warning lights 308 may include multiple colors of lights or lenses for displaying a particular color scheme, as mentioned above. For example, a green light may represent that the area is safe; a red light may represent that a threat has been detected in the building or nearby; a yellow light may represent that there is a possible threat in the building or in the area. The strobe light 306 is configured to draw attention to the beacon 274 when a threat is detected. The head 304 or strobe light fixture 306 may further include a position sensor, such as a camera that is optimized and adjusted in a location to obtain the best input. Some of the sensors may be on controllable and mechanized members for rotation, general movement, and positioning. Some sensors may have first-time adjustment capability, which is not controllable.

Figure 13:
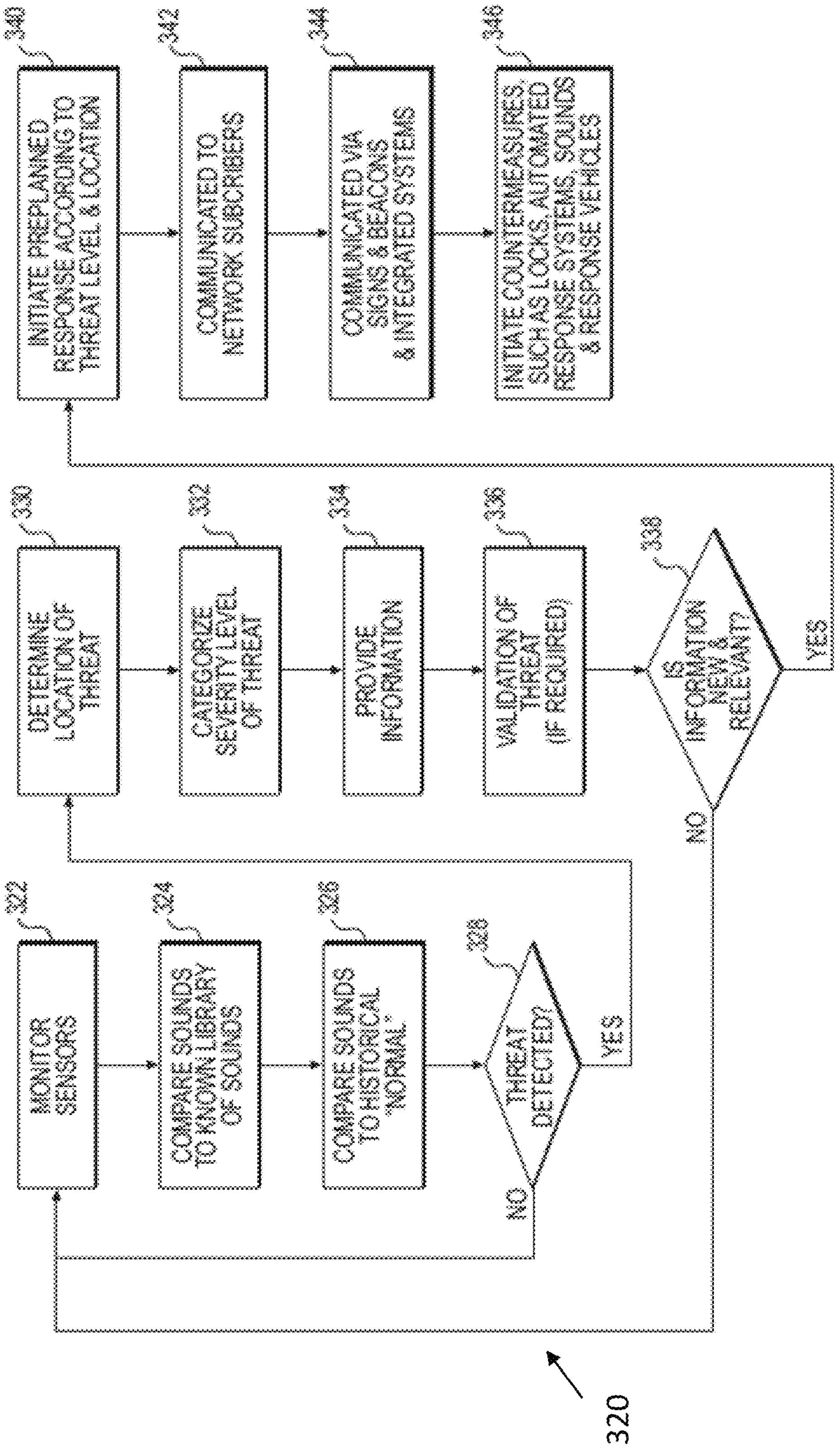
FIG. 13 is a flow diagram illustrating a method that may be executed by the security system of FIG. 1 or FIG. 11.

FIG. 13 shows a flow diagram of an embodiment of a method 320 that may be executed by the security system 10, security system 240, or other security system using the components described herein. The method 320 includes a step 322 of monitoring the sensors of the security system. The method 320 also includes a block 324 that indicates that sounds monitored in step 322 are compared to a known library of sounds. As indicated in block 326, the sounds are compared to a historical norm. From the comparisons in blocks 324 and 326, the method 320 includes a decision diamond 328 that indicates that it is determined whether a threat is detected. Input devices or devices to alert of a threat include but are not limited to; hardwire alert button; hand held radio transmitter (FOB), sound intensity and duration monitoring, hot word recognition, gunshot detection, threat notice received from phone app, etc.

If no threat is detected in decision diamond 328, the method 320 returns back to 322 to continue monitoring the sensors. However, if a threat is detected, the method 320 proceeds to block 330, in which the location of the threat is determined. For example, if the threat detected is a gunshot sound, the location of the threat can be determined by triangulation based on the volume of the sound detected by microphones at different locations or by using other techniques known in the art. Block 332 indicates that the severity level of the threat is categorized. For example, the threat levels may be categorized from low to high depending on the type of threat, the danger that the threat might be to the occupants of the building, the response time that is needed to counteract the threat, the amount of manpower needed to counteract the threat, etc. In response to determining the threat categorization, information is provided, as indicate in block 334. In some embodiments, a validation of the threat may be needed, as indicated in block 336. For example, validation may require a staff member, supervisor, or first responder to confirm that the threat is real and/or may require a confirmation by more than one person. If a threat is detected, a camera in one or more smart signs 50, 350, 351, 390, 391, 405, 410, 510 can be activated enabling validation of a threat and the threat level.

As indicated in decision diamond 338, the method 320 includes the step of determining if information that is received is either new information and/or relevant information. If the information is not new or relevant, the method returns back to block 322 to continue monitoring the sensors for new and/or relevant data. If new and/or relevant information is received in decision diamond 338, the method 320 proceeds to block 340, which indicates that a pre-planned response is initiated according to the determined threat levels and locations. The initiation of such a plan may include determining from a number of possible emergency scenarios how the occupants should be directed to remove them away from the threat and/or to instruct them how to behave or response when a threat is detected. The master controller 12, 242 has preplanned evacuation routes for each room location in the building. Based on this plan, evacuation signage will activate a warning to the occupants in the immediate area of the threat to, as example, shelter-in-place. The signage will alert the occupants with signage that changes colors (preferably red), and colored strobe lights (preferably red) and provide verbal instructions through speakers located in or near the signage. Occupants in areas with routes deemed safe to exit will receive signage instruction with a different color signage and strobe lights (preferably green) and instructions to follow the (preferably green) strobing lights away from the threat, informing the occupants in seconds on what to do and what routes are safe.

The method 320 further includes block 342 for communicating information to a number of network subscribers. Communicating this information will be based on the type of pre-planned response that is initiated in block 340. For example, this step 342 may include communicating information to occupants (e.g., students, teachers, staff, etc.), to people related to occupants (e.g., parents, spouses, etc.), and to emergency personnel (e.g., police, fire department, or other first responders). The method 320 further includes communicating (block 344) via signs, beacons, and other integrated components of the security system 10, 240 for directing the occupants to safety, instructing the occupants to stay put, providing information to authorized people for using weapons, etc. Also, block 346 indicates that other countermeasures are taken in response to a threat. For example, the countermeasures may include locking or unlocking certain doors/windows or sets of doors/windows. The countermeasures may also include providing an automated response system, such as sounds and lights, and requesting external assistance from response vehicles.

The security system 10 provides a process by which the signage illumination can be modulated to reduce energy usage without interfering with the functions of identifying exits and providing emergency evacuation. The master controller 12, 242 can identify appropriate times to reduce or terminate electricity to the signage. For example, the master controller 12, 242 may include a clock, and the plurality of smart signs in electronic communication with the master controller 12, 242 may be instructed by the master controller 12, 242 to deactivate or reduce power to light sources during certain time periods (e.g., hours when the secure area is expected to be unoccupied). In some embodiments in which at least one input device 14 is a motion sensor, the master controller 12, 242 may be configured to reactivate or increase power to light sources in some or all smart signs in the security system 10 upon detection of motion during the power modulation period. In further embodiments in which at least one input device is a sound detector such as a microphone and at least out output device is a sound emitter, such as a speaker, the master controller 12, 242 may be configured to activate the sound emitter and speaker to allow communication between an individual monitoring the security system and the individual who triggered the motion sensor. In further embodiments, if an individual enters the building during the predetermined power modulation period, and input devices detect motion, a fire, a gunshot, or other triggering activity, the master controller 12, 242 may be configured to activate a subset of or all input and output devices and to initiate predetermined communication protocols to security and/or authorities.

Various aspects of different embodiments of the present disclosure are expressed in paragraphs X1, X2, X3, X4, and X5 as follows:

X1. An embodiment of the present disclosure include a security system comprising: a plurality of input devices positioned at a plurality of locations in or around a secure area to be monitored; a master controller in electrical communication with the plurality of input devices and configured to receive input signals from the plurality of input devices, the input signals being indicative of sensory activity detected within the secure area, the master controller further configured to analyze the input signals to determine whether a potential security issue exists; and a plurality of output devices in electrical communication with the master controller and configured to receive indication from the master controller when the potential security issue exists; wherein, in response to receiving indication from the master controller when the potential security issue exists, the plurality of output devices are configured to assist occupants within the secure area to respond to the potential security issue; and wherein the plurality of output devices include an instructional sign configured to direct the movement of occupants located in the vicinity of the instructional sign to a designated safety zone; and wherein at least one of the plurality of input devices is located in the instructional sign.

X2. Another embodiment of the present disclosure includes a method for managing potential security issues, the method comprising the steps of: receiving sensory activity of a secure area to be monitored using a plurality of input devices positioned at a plurality of locations in or around the secure area; analyzing the sensory activity to determine if a potential security threat exists; and in response to determining that a potential security threat exists, activating at least one of a plurality of output devices to assist occupants within the secure area to respond to the potential security threat; wherein at least one of the plurality of output devices is an instructional sign, and wherein at least one of the plurality of input devices is incorporated into the instructional sign.

X3. A further embodiment of the present disclosure includes a smart emergency exit sign comprising: a housing including a first section, the first section including a center section and two end sections disposed on opposite ends of the center section; a first light barrier disposed between the center section and each end section; and light sources in the center section and each end section.

X4. Another embodiment of the present disclosure includes a smart hallway intersection sign comprising: a housing including a top, a bottom, and at least one side; a plurality of independently illuminable directional arrows located on the bottom, each of the plurality of independently illuminable directional arrows pointing in different directions; and at least one strobe light located in the side of the housing.

X5. A further embodiment of the present disclosure includes a supplemental smart emergency sign comprising: a housing; at least one strobe light in the housing; and means for electronic communication between the supplemental smart emergency sign and a remotely located master controller, wherein each of the at least one strobe light is configured to be independently activated or deactivated by the master controller.

Yet other embodiments include the features described in any of the previous paragraphs X1, X2, X3, X4 or X5 as combined with one of more of the following aspects:

Wherein the instructional sign is configured to illuminate at least one arrow symbol to direct the occupants located in the vicinity of the instructional sign to move in at least one direction to one or more designated safety zones.

Wherein the instructional sign is configured to illuminate at least one word on the instructional sign to direct the occupants located in the vicinity of the instructional sign to exit their current location or to seek shelter in their current location.

Wherein the master controller is configured to identify and track the location of a threat based on the sensory activity obtained by the plurality of input devices over time.

Wherein the plurality of output devices are configured to change an escape management plan according to changes in the location of the threat over time.

Wherein, in response to detection of a potential security issue, the plurality of output devices are configured provide push alerts to at least the occupants within the secure area.

Wherein at least one of the plurality of output devices includes a graphical user interface (GUI) showing a floor plan of a building within the secure area.

Further comprising memory in communication with the master controller, wherein the memory includes threat analysis software.

Wherein the memory further includes at least one of a floor plan of monitored areas, a crowd movement algorithm, a database for storing audio and video data obtained by at least one of the plurality of input devices, facial recognition software, and vehicle recognition software.

Further comprising components for automatically locking and unlocking doors and controlling light fixtures within a building in the secure area, the components being in electrical communication with and controlled by the master controller.

Further comprising a response access kit comprising lethal or non-lethal weapons, the response access kit being in electrical communication, and whereby access to the response access kit is controlled by the master controller.

Further comprising an unmanned autonomous system in electrical communication with and controlled by the master controller.

Further comprising a wireless communication device configured to communicate information regarding a potential security issue to a plurality of mobile devices associated with the occupants and to receive supplemental information from the plurality of mobile devices based on observations made by the occupants.

Wherein at least one of the plurality of output devices includes a beacon comprising lights having different colors for communicating various threat levels.

Wherein the beacon further comprises flashing lights, sirens, speakers, and directional symbols for directing the occupants in at least one direction.

Wherein the plurality of input devices comprise audio detectors for detecting at least one of particular sound patterns, escalating noise levels, a specific keyword, or a gunshot.

Further comprising an external interface for communicating the existence of the potential security issue to at least one external emergency agency.

Wherein the instructional sign is at least one of: (1) a smart emergency exit sign including a housing including a first section, the first section including a center section and two end sections disposed on opposite ends of the center section, a first light barrier disposed between the center section and each end section, independently controllable light sources in the center section and each end section, and means for electronic communication between the smart emergency exit sign and the master controller, wherein the independently controllable light sources and the at least one of the input device and the output device are configured to be independently activated or deactivated by the master controller; (2) a smart hallway intersection sign including a housing including a top, a bottom, and at least one side, a plurality of independently illuminable directional arrows located on the bottom, each of the plurality of independently illuminable directional arrows pointing in different directions, at least one strobe light located in the side of the housing, and means for electronic communication between the smart hallway intersection sign and the master controller, wherein the independently illuminable directional arrows and the at least one strobe light are configured to be independently activated or deactivated by the master controller; (3) a supplemental smart emergency sign including a housing, at least one strobe light in the housing, and means for electronic communication between the supplemental smart emergency sign and a remotely located master controller, wherein each of the at least one strobe light is configured to be independently activated or deactivated by the master controller; and (4) a hallway sign including a housing including opposing ends, at least one light source located in each end, and means for electronic communication between the hallway sign and the master controller, wherein each of the at least one light sources located in each end are configured to be independently activated or deactivated by the master controller.

Further comprising the steps of identifying and tracking the location of the potential security threat based on the sensory activity obtained over time, and changing an escape management plan according to changes in the location of the potential security threat over time.

Further comprising the steps of automatically locking/unlocking doors and windows, controlling light fixtures within a building in the secure area, and enabling access to a response access kit by authorized personnel, the response access kit comprising lethal or non-lethal weapons, and or emergency medical supplies.

Further comprising a first face attached to the housing, whereby a portion of the first face is opaque and another portion of the first face is non-opaque, whereby at least one non-opaque portion of the first face overlies the center section of the first section and each end section of the first section, and whereby the non-opaque portion overlying each of the center section of the first section and each end section of the first section may be independently illuminated.

Further comprising a second section, wherein the second section includes a center section and two end sections disposed on opposite ends of the center section of the second section, a second light barrier disposed between the center section and each end section of the second section, a second face attached to the housing, whereby a portion of the second face is opaque and another portion of the second face is non-opaque, and whereby at least one non-opaque portion of the second face overlies the center section of the second section and each end section of the second section, and light sources in the center section of the second section and each end section of the second section, whereby the non-opaque portion overlying each of the center section and each end section of the second section may be independently illuminated.

Wherein the first light barrier includes a reflective surface on an illumination side of the first light barrier and wherein the first light barrier is shaped to focus light outward from the housing through the non-opaque portion of the first face.

Wherein the first face includes an interior side facing the light sources and an exterior side opposite the interior side, and wherein the interior side includes a reflective surface on the opaque portion of the first face, the reflective surface on the opaque portion being shaped to reflect light onto the reflective surface of the first light barrier.

Further comprising a first non-opaque panel extending from the housing, wherein the independently controllable lights sources in the center section of the first section and each end section of the first section each illuminate separate portions of the first non-opaque panel.

Further comprising a second section, wherein the second section includes a center section and two end sections disposed on opposite ends of the center section of the second section, a second light barrier disposed between the center section and each end section of the second section, light sources in the center section of the second section and each end section of the second section; and a second non-opaque panel extending from the housing, wherein the independently controllable lights sources in the center section of the second section and each end section of the second section each illuminate separate portions of the second non-opaque panel.

Wherein the first light barrier includes a reflective surface on an illumination side of the first light barrier and wherein the first light barrier is shaped to focus light onto the non-opaque panel.

Further comprising at least one strobe light in the housing, the strobe light being controllable independently of the light sources.

Further comprising at least one of an input device and an output device.

Wherein the at least one input device includes a sound detector and wherein the at least one output device includes a strobe light and a sound emitter.

Further comprising means for electronic communication between the smart emergency exit sign and a remotely located master controller, wherein the independently controllable light sources and the at least one of the input device and the output device are configured to be independently activated or deactivated by the master controller.

Wherein light sources in the center section and each end section are independently controllable.

Further comprising means for electronic communication between the smart hallway intersection sign and a remotely located master controller, wherein the independently illuminable directional arrows and the at least one strobe light are configured to be independently activated or deactivated by the master controller.

Wherein means for electronic communication between the smart emergency sign, smart hallway intersection sign, or supplemental smart emergency sign and master controller include a wired or wireless connection between the smart emergency sign, smart hallway intersection sign, or supplemental smart emergency sign and master controller.

Wherein means for electronic communication between the smart emergency sign, smart hallway intersection sign, or supplemental smart emergency sign and master controller include a Wi-Fi connection between the smart emergency sign, smart hallway intersection sign, or supplemental smart emergency sign and master controller.

Further comprising at least one of an input device and an output device.

Wherein the at least one input device includes a sound detector and wherein the at least one output device includes a strobe light and a sound emitter.

Wherein the sound emitter is one of a speaker, a siren, or an alarm.

Further including an attachment feature for attaching the supplemental smart emergency sign to an existing exit sign.

Wherein the first face includes an exit indicator and at least one directional arrow.

Wherein the first panel is a center panel corresponding to a center section and two end panels, each corresponding to an end section.

Wherein the center panel includes an exit indicator and wherein each end panel includes a directional arrow.

The foregoing detailed description is given primarily for clearness of understanding and no unnecessary limitations are to be understood therefrom, for modifications can be made by those skilled in the art upon reading this disclosure and may be made without departing from the spirit of the invention. Although specific spatial dimensions are stated herein, such specific quantities are presented as examples only. Reference systems, if used herein, refer generally to various directions (for example, top, bottom, upper, lower, forward, rearward, left, right, etc.), which are merely offered to assist the reader in understanding the various embodiments of the disclosure and are not to be interpreted as limiting. Other reference systems may be used to describe various embodiments.

What is claimed is:

1. A security system comprising:

a plurality of input devices positioned at a plurality of locations in or around a secure area to be monitored;

a master controller in electrical communication with the plurality of input devices and configured to receive input signals from the plurality of input devices, the input signals being indicative of sensory activity detected within the secure area, the master controller further configured to analyze the input signals to determine whether a potential security issue exists; and a plurality of output devices in electrical communication with the master controller and configured to receive indication from the master controller when the potential security issue exists;

wherein, in response to receiving indication from the master controller when the potential security issue exists, the plurality of output devices are configured to assist occupants within the secure area to respond to the potential security issue; and wherein the plurality of output devices include at least one instructional sign configured to direct the movement of occupants located in the vicinity of the instructional sign to a designated safety zone, where at least one of the at least one instructional sign is a smart emergency exit sign comprising a housing including an interior; a first section within the interior, the first section including a center section and two end sections disposed on opposite ends of the center section; a first light barrier within the interior disposed between the center section and each end section; and light sources within the interior in the center section and each end section; and an illumination light within the interior but outside the center section and the end sections; wherein the first light barrier compartmentalizes the interior of the housing into the center section and the end sections and isolates the center section from each end section and each end section from each other such that illumination of light sources in one of the center section or end section does not illuminate the others of the center section and end section; and wherein at least one of the plurality of input devices is located in the at least one instructional sign.

2. The security system of claim 1, wherein the at least one instructional sign is configured to illuminate at least one arrow symbol to direct the occupants located in the vicinity of the at least one instructional sign to move in at least one direction to one or more designated safety zones.

3. The security system of claim 1, wherein the at least one instructional sign is configured to illuminate at least one word on the at least one instructional sign to direct the occupants located in the vicinity of the at least one instructional sign to exit their current location or to seek shelter in their current location.

4. The security system of claim 1, wherein the master controller is configured to identify and track the location of a threat based on the sensory activity obtained by the plurality of input devices over time.

5. The security system of claim 4, wherein the plurality of output devices are configured to change an escape management plan according to changes in the location of the threat over time.

6. The security system of claim 1, wherein, in response to detection of a potential security issue, the plurality of output devices are configured to provide push alerts to at least the occupants within the secure area.

7. The security system of claim 1, wherein at least one of the plurality of output devices includes a graphical user interface (GUI) showing a floor plan of a building within the secure area.

8. The security system of claim 1, further comprising memory in communication with the master controller, wherein the memory includes threat analysis software.

9. The security system of claim 8, wherein the memory further includes at least one of a floor plan of monitored areas, a crowd movement algorithm, a database for storing audio and video data obtained by at least one of the plurality of input devices, facial recognition software, and vehicle recognition software.

10. The security system of claim 1, further comprising components for automatically locking and unlocking doors and controlling light fixtures within a building in the secure area, the components being in electrical communication with and controlled by the master controller.

11. The security system of claim 1, further comprising a response access kit comprising lethal or non-lethal weapons, the response access kit being in electrical communication, and whereby access to the response access kit is controlled by the master controller.

12. The security system of claim 1, further comprising an unmanned autonomous system in electrical communication with and controlled by the master controller.

13. The security system of claim 1, further comprising a wireless communication device configured to communicate information regarding a potential security issue to a plurality of mobile devices associated with the occupants and to receive supplemental information from the plurality of mobile devices based on observations made by the occupants.

14. The security system of claim 1, wherein at least one of the plurality of output devices includes a beacon comprising lights having different colors for communicating various threat levels.

15. The security system of claim 14, wherein the beacon further comprises flashing lights, sirens, speakers, and directional symbols for directing the occupants in at least one direction.

16. The security system of claim 1, wherein the plurality of input devices comprise audio detectors for detecting at least one of particular sound patterns, escalating noise levels, a specific keyword, or a gunshot.

17. The security system of claim 1, further comprising an external interface for communicating the existence of the potential security issue to at least one external emergency agency.

18. The security system of claim 1, wherein the at least one instructional sign includes at least a first and a second instructional sign, the second instruction sign being at least one of:

a smart hallway intersection sign including a housing including a top, a bottom, and at least one side, a plurality of independently illuminable directional arrows located on the bottom, each of the plurality of independently illuminable directional arrows pointing in different directions, at least one strobe light located in the side of the housing, and means for electronic communication between the smart hallway intersection sign and the master controller, wherein the independently illuminable directional arrows and the at least one strobe light are configured to be independently activated or deactivated by the master controller; or a supplemental smart emergency sign including a housing, at least one strobe light in the housing, and means for electronic communication between the supplemental smart emergency sign and a remotely located master controller, wherein each of the at least one strobe light is configured to be independently activated or deactivated by the master controller; or a hallway sign including a housing including opposing ends, at least one light source located in each end, and means for electronic communication between the hallway sign and the master controller, wherein each of the at least one light sources located in each end are configured to be independently activated or deactivated by the master controller.

19. A method for managing potential security issues, the method comprising the steps of:

receiving sensory activity of a secure area to be monitored using a plurality of input devices positioned at a plurality of locations in or around the secure area;

analyzing the sensory activity to determine if a potential security threat exists; and in response to determining that a potential security threat exists, activating at least one of a plurality of output devices to assist occupants within the secure area to respond to the potential security threat;

wherein at least one of the plurality of output devices is an instructional sign, wherein at least one of the plurality of input devices is incorporated into the instructional sign, and where the instructional sign is a smart emergency exit sign comprising a housing including an interior; a first section within the interior, the first section including a center section and two end sections disposed on opposite ends of the center section; a first light barrier within the interior disposed between the center section and each end section; and light sources within the interior in the center section and each end section; and an illumination light within the interior but outside the center section and the end sections;

wherein the first light barrier compartmentalizes the interior of the housing into the center section and the end sections and isolates the center section from each end section and each end section from each other such that illumination of light sources in one of the center section or end section does not illuminate the others of the center section and end section.

20. The method of claim 19, further comprising the steps of:

identifying and tracking the location of the potential security threat based on the sensory activity obtained over time; and changing an escape management plan according to changes in the location of the potential security threat over time.

21. The method of claim 19, further comprising the steps of:

automatically locking/unlocking doors and windows;

controlling light fixtures within a building in the secure area; and enabling access to a response access kit by authorized personnel, the response access kit comprising lethal or non-lethal weapons, and or emergency medical supplies.

* * * * *